US012513476B2

United States Patent
(12) United States Patent
Daley et al.

(10) Patent No.: US 12,513,476 B2
(45) Date of Patent: Dec. 30, 2025

(54) ADJUSTABLE FIT HEARING AIDS

(71) Applicant: Bose Corporation, Framingham, MA (US)

(72) Inventors: Michael J. Daley, Shrewsbury, MA (US); Christopher R. Paetsch, Cambridge, MA (US); Christine Dobie, Brighton, MA (US); Ryan Joseph Wexler, Boston, MA (US); Andrew D. Dominijanni, Newton, MA (US)

(73) Assignee: Bose Corporation, Framingham, MA (US)

( * ) Notice: Subject to any disclaimer, the term of this patent is extended or adjusted under 35 U.S.C. 154(b) by 207 days.

(21) Appl. No.: 17/917,048

(22) PCT Filed: Apr. 6, 2021

(86) PCT No.: PCT/US2021/025957
§ 371 (c)(1),
(2) Date: Oct. 5, 2022

(87) PCT Pub. No.: WO2021/207190
PCT Pub. Date: Oct. 14, 2021

(65) Prior Publication Data
US 2023/0164501 A1 May 25, 2023

Related U.S. Application Data

(60) Provisional application No. 63/005,613, filed on Apr. 6, 2020.

(51) Int. Cl.
*H04R 25/00* (2006.01)

(52) U.S. Cl.
CPC ......... *H04R 25/609* (2019.05); *H04R 25/604* (2013.01); *H04R 25/607* (2019.05); *H04R 25/656* (2013.01); *H04R 2225/0213* (2019.05); *H04R 2225/0216* (2019.05)

(58) Field of Classification Search
CPC .. H04R 25/609; H04R 25/659; H04R 25/607; H04R 25/604; H04R 25/656; H04R 2225/0216; H04R 2225/0213
See application file for complete search history.

(56) References Cited

U.S. PATENT DOCUMENTS 4,727,582 A * 2/1988 de Vries ............... H04R 25/604 381/322
2006/0159298 A1* 7/2006 von Dombrowski .... H04R 1/24 381/330
2009/0180653 A1* 7/2009 Sjursen .................. H04R 25/60 381/322
2017/0094425 A1* 3/2017 Baeriswyl ............ H04R 25/607
2019/0208332 A1 7/2019 Higgins

OTHER PUBLICATIONS

ISRWO dated Aug. 17, 2021 for PCTUS2021/025957.

* cited by examiner

*Primary Examiner* — Mark Fischer

(57) ABSTRACT

A hearing aid (600) includes an earpiece (602), a casing (604), and coupling member (612). The earpiece (602) is configured to sit at least partially within the user's ear canal when worn. The casing (604) supports a sound processor (608) and a microphone (606) and is configured to sit behind a users ear and in contact with the user's pinna when worn. The coupling member (612) couples the casing (604) to the earpiece (602). The coupling member (612) has an effective length that is adjustable to accommodate users with different ear geometries.

11 Claims, 27 Drawing Sheets

ADJUSTABLE FIT HEARING AIDS

TECHNICAL FIELD

This disclosure relates to hearing aids, and, particularly, to adjustable fit hearing aids.

BACKGROUND

Getting a hearing aid has traditionally required consumers to see a licensed professional, which requires appointments, tests and fittings. In the end, consumers (patients) may end up spending thousands of dollars—an expense not covered by Medicare or most insurance companies.

Thanks to a federal law passed in 2017, consumers may soon have access to over-the-counter (OTC) hearing aids that are expected to bring down the price and hassles associated with purchasing traditional hearing aids. These new devices are expected to cost less than traditional hearing aids.

The variability of ear geometry across the population makes it difficult to produce a universal-fit hearing aid. Manufacturers will need a simple and cost-effective way to allow consumers to find an OTC solution with an appropriate fit.

A conventional wire system of a traditional receiver-in-canal (RIC) hearing aid 100 is shown in FIG. 1. A typical RIC hearing aid 110 includes a behind-the-ear portion 102 that includes a battery, a microphone, and a sound processor housed in a casing 104 designed to sit behind a user's ear resting against a rear surface of the user's pinna. This behind-the-ear portion 102 of the hearing aid 100 has a small wire 106 (wiring cable) designed to run around the user's ear and into an earpiece 108 that is designed to sit in the user's ear canal. The earpiece 108 carries a speaker, also known a "receiver," "driver," "electro-acoustic transducer," or simply "transducer." Conventional hearing aids also often include a compliant tip 110 (or "dome") on the earpiece 108 for engaging with a user's ear canal.

Typically, an audiologist makes a measurement and selects the appropriate wire length from a manufacturer-supplied set 200, see FIG. 2. A manufacturer may offer between three and five different wire lengths to accommodate the full span of ear geometry.

The wire provides both an electrical connection and a mechanical coupling between the ear and the device. Using the wrong length leads to the device being unstable and falling off the patient. See FIG. 3 for an example of a small ear fitted with the correct wire length 300 (left) and one that is too long 302 (right), and FIG. 4 for a larger ear fitted with a wire that is too short 400 (left) and a correct wire length 402 (right).

Conventional behind-the-ear (BTE) hearing aids have a similar form factor, with a case that sits behind a user's ear, and attached ear piece that directs sound to the user's ear canal. While both RIC and BTE hearing aids are technically behind-the-ear, the BTE has more components behind the ear. In that regard, the BTE hearing aids have the microphone, receiver (speaker), battery, and sound processor all behind the ear, with just a tube running around the ear and into the ear piece for conducting acoustic energy from the speaker to the user's ear canal.

SUMMARY

All examples and features mentioned below can be combined in any technically possible way.

In one aspect, a hearing aid includes an earpiece, a casing, and coupling member. The earpiece is configured to sit at least partially within the user's ear canal when worn. The casing supports a sound processor and a microphone and is configured to sit behind a user's ear and in contact with the user's pinna when worn. The coupling member couples the casing to the earpiece. The coupling member has an effective length that is adjustable to accommodate users with different ear geometries.

Implementations may include one of the following features, or any combination thereof.

In some implementations, the coupling member includes one or more compliant, spring-biased bends that can be straightened under tension to accommodate larger ear geometries.

In certain implements, the one or more complaint, spring-biased bends provide the coupling member with an S-shape.

In some cases, the coupling member includes a polymeric tube and wherein the compliant, spring-biased bends are formed by the polymeric tube.

In certain cases, the coupling member includes wiring and a cover that surrounds the wiring.

In some examples, the complaint, spring-biased bends are formed by the wiring. In certain examples, the complaint, spring-biased bends are formed by the cover.

In some implementations, the coupling member has regions of varying stiffness including a first region proximate the casing having a first stiffness, and a second region arranged between the first region and the earpiece having a second stiffness that is two to five times less stiff than the first stiffness.

In certain implementations, the casing includes a plurality of connection points and the coupling member may be selectively coupled to any one of the connection points to adjust an effective length of the coupling member.

In some cases, the coupling member includes a pre-strained wire formed from a shape memory alloy which extends when heated to adjust the effective length of the coupling member.

In certain cases, the coupling member includes a first portion that includes a coiled coupling section encased in an elastomer. The elastomer provides compliance thereby allowing the coiled coupling section to be stretched to adjust the effective length of the coupling section.

In some examples, the coupling member includes a first conductor portion that is electrically coupled to the sound processor in the casing and a second conductor portion that is electrically coupled to a receiver supported in the earpiece. The first and second conductor portions are slidable relative to each other and are configured to maintain an electrical connection therebetween as they are displaced, thereby to adjust the effective length of the coupling member.

In certain examples, the coupling member includes a corrugated section that includes a series of corrugations that can be collapsed on themselves to shorten the effective length of the coupling member and can be extended to increase the effective length of the coupling member.

In some implementations, the coupling member includes a plurality of links that are hinged together at joints. The links can be folded on top of one another to shorten the effective length of the coupling member and can be unfolded to increase the effective length of the coupling member.

In certain implementations, the casing defines an aperture and a cavity within which the sound processor is disposed.

The effective length of the coupling member can be adjusted by pushing or drawing a portion of the coupling member into the cavity via the aperture.

In some cases, the hearing aid includes an adjustment member supported by the housing and moveable relative thereto. The adjustment member is operable to draw the portion of the coupling member into the cavity.

In certain cases, the hearing aid includes a guide member that is disposed within the cavity and arranged to help guide the portion of the coupling member that is received within the housing.

In some examples, the coupling member is segmented and wherein the effective length of the coupling member can be adjusted by adding or removing one or more segments.

In certain examples, the coupling member is at least partially formed of a material that stiffens when heat is applied to it, and the effective length of the coupling member is configured to be adjusted by pushing or drawing a portion of the coupling member into the cavity via the aperture while the coupling member is in a loose flexible state, and the effective length is fixed in place by applying heat to stiffen the coupling member.

In some implementations, the earpiece includes a housing, a first dome, and second dome. The housing has a first end that is coupled to the coupling member and a second, opposite end that defines a nozzle configured to deliver acoustic energy to a user's ear canal when worn. The first dome is supported by the nozzle and the second dome is supported by the housing in a position between the nozzle and the first end of the housing.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations.

DETAILED DESCRIPTION

This disclosure relates to coupling members for connecting a behind-the-ear portion of a hearing aid to an earpiece. The coupling members of this disclosure enable accommodation for different ear geometries.

Multiple Connection Points

Figure 5:
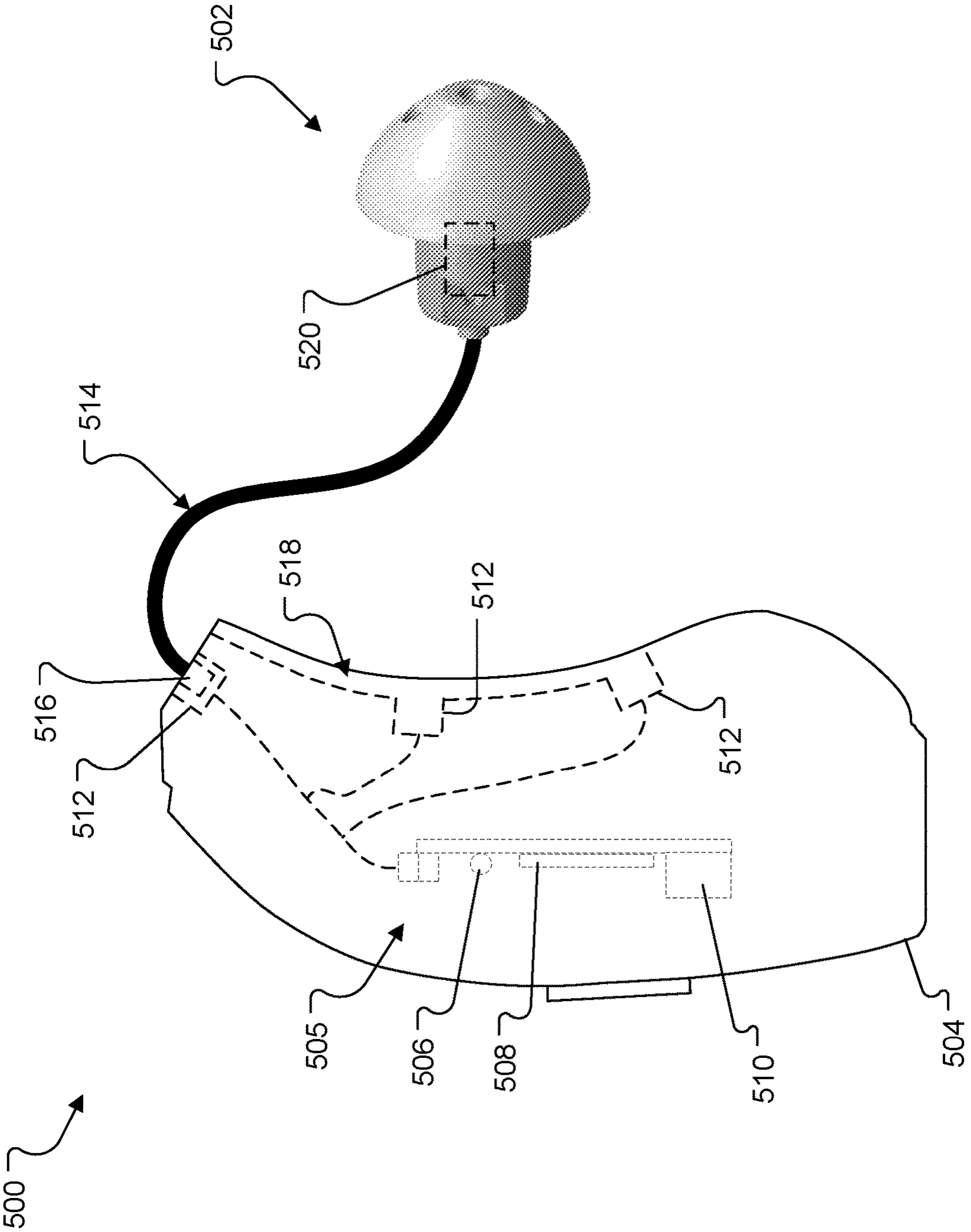
FIG. 5 is a schematic side view of a hearing aid having a plurality of connection points (e.g., sockets) for adjusting an effective length of a coupling member.

FIG. 5 illustrates an exemplary embodiment of a hearing aid 500 constructed according to this disclosure. The hearing aid 500 includes an earpiece 502 and a casing 504, which houses electronics 505 including a microphone 506, sound processor 508, and battery 510 for powering the microphone 506 and processor 508. The casing 504 is designed to sit behind a user's ear resting against a rear surface of the user's pinna.

To accommodate different ear geometries, a plurality (three shown) of connectors 512 (e.g., sockets) are located along the outside, or inside the casing 504. A coupling member 514 with a mating connector 516 may be plugged into any one of the sockets 512. This effectively allows a single coupling member 514 to achieve multiple lengths between the casing 504 and the earpiece 502. The opposite end of the coupling member 514 may lay against the external surface of the casing 504 or may be recessed into a channel 518 along the length of the casing 504 or may be contained inside the casing 504.

A curvature of the coupling member 514 may be formed such that it follows a curvature of the casing 504 when adjusted for small ear geometries. A section of the coupling member 514 near the housing end may be more flexible than a section near the opposite, earpiece end to allow adjustment of the compound curve of the coupling member 514 while retaining stiffness near the earpiece 502 for ease of insertion and removal from a user's ear.

In the case of a RIC style hearing aid, the coupling member 514 may comprise wiring; e.g., a pair of electrically conductive wires contained in a conduit, e.g., a polymeric sleeve or tube, that enables the transmission of electrical energy from the casing 504 to the receiver 520 in the earpiece 502. In this case, the connectors 512 on the casing 504 are electrical connectors, e.g., electrical sockets, and the mating connector 516 is an electrical connector to enable an electrical connection to be formed between the electronics in the casing 504 and the receiver 520 in the earpiece 502.

A similar configuration may be utilized for a behind-the-ear (BTE) style hearing aid. In the BTE configuration, a plurality of acoustic contact points (e.g., acoustic sockets) may be located along the outside, or inside the casing. The acoustic contact points may be acoustically coupled to the receiver housed in the casing. A single tube with a mating acoustic contact point may be plugged into any one of the sockets and may be used to convey acoustic energy from the receiver in the casing to the earpiece. This effectively allows a single tube to achieve multiple lengths between the casing and the earpiece. The opposite end of the tube may lay against the external surface of the casing or may be recessed into a channel along the length of the casing or may be contained inside the casing.

Integrated Spring

In another implementation, to eliminate the need for multiple coupling lengths to accommodate for different ear geometries, or at least reduce the number of lengths, a coupling member comprising spring-like bends is proposed.

The coupling member must meet two, opposing design requirements: (1) provide enough tension in the wire to keep the device in place, particularly on smaller ears and (2) be soft enough to extend in length while not applying an uncomfortable amount of force, particularly on larger ears.

Figure 6:
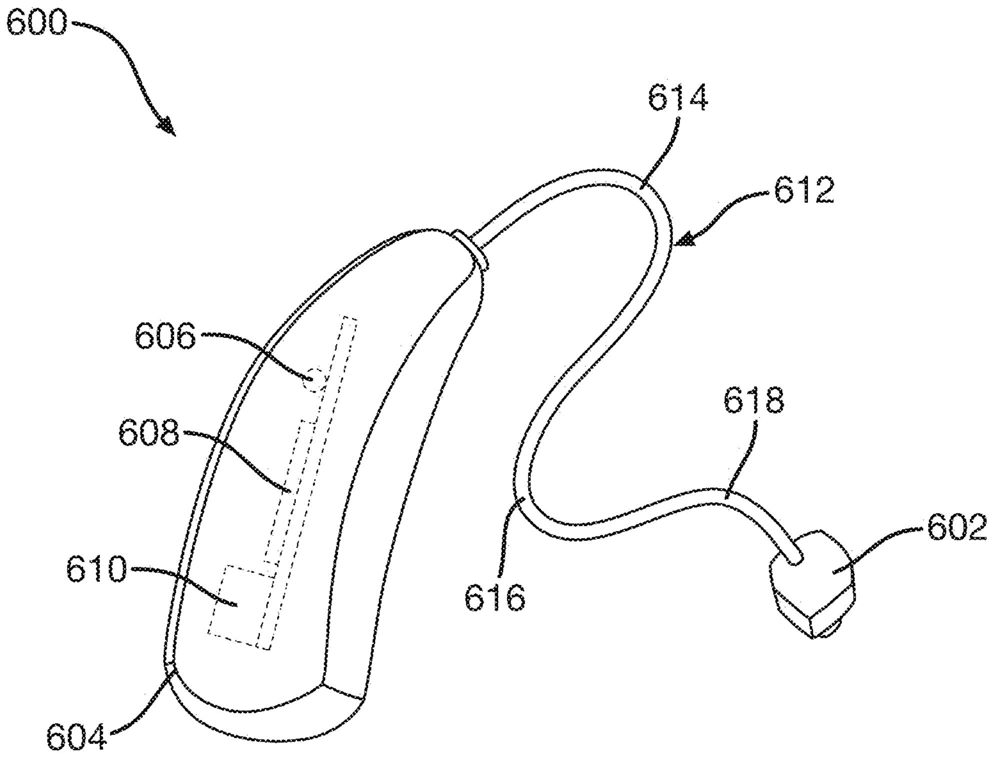
FIG. 6 is a schematic side view of a hearing aid having a coupling member with an integrated spring in the form of an S-curve.

Finite element analysis can be used to determine what wire shapes meet the required stiffness. While many designs may meet these requirements, an example of an S-shaped coupling member is shown in FIG. 6. However, other spring configurations, including other curved shapes, e.g., a "C-shaped curve," are also contemplated.

FIG. 6 shows an exemplary hearing aid 600 that includes an earpiece 602 and a casing 604, which houses a microphone 606, sound processor 608, and battery 610 for powering the microphone 606 and processor 608. As noted above, the coupling member 612 is provided with an integrated spring in the form of an S-curve that includes a first curve 614 between the casing 604 and the earpiece 602; and a second curve 616 between the first curve 614 and the earpiece 602. In some cases, a third curve 618 may be provided between the second curve 616 and the earpiece 602. In some cases, the first, second and third curves 614, 616, 618 may reside in respective regions of contrasting stiffness (e.g., least stiff near the earpiece 602 and more stiff near the casing 604. In that regard, the first curve 614 may be in a region having a stiffness of greater than 1000 Newtons per meter (N/m); the second curve 616 may be in a second region having a stiffness of 200 to 400 Newtons per meter (N/m); and the third curve 618 may be in a third region having a stiffness of 400 to 1000 Newtons per meter (N/m). The overall stiffness of the integrated, composite spring is 200 to 400 Newtons per meter (N/m).

Figure 1:
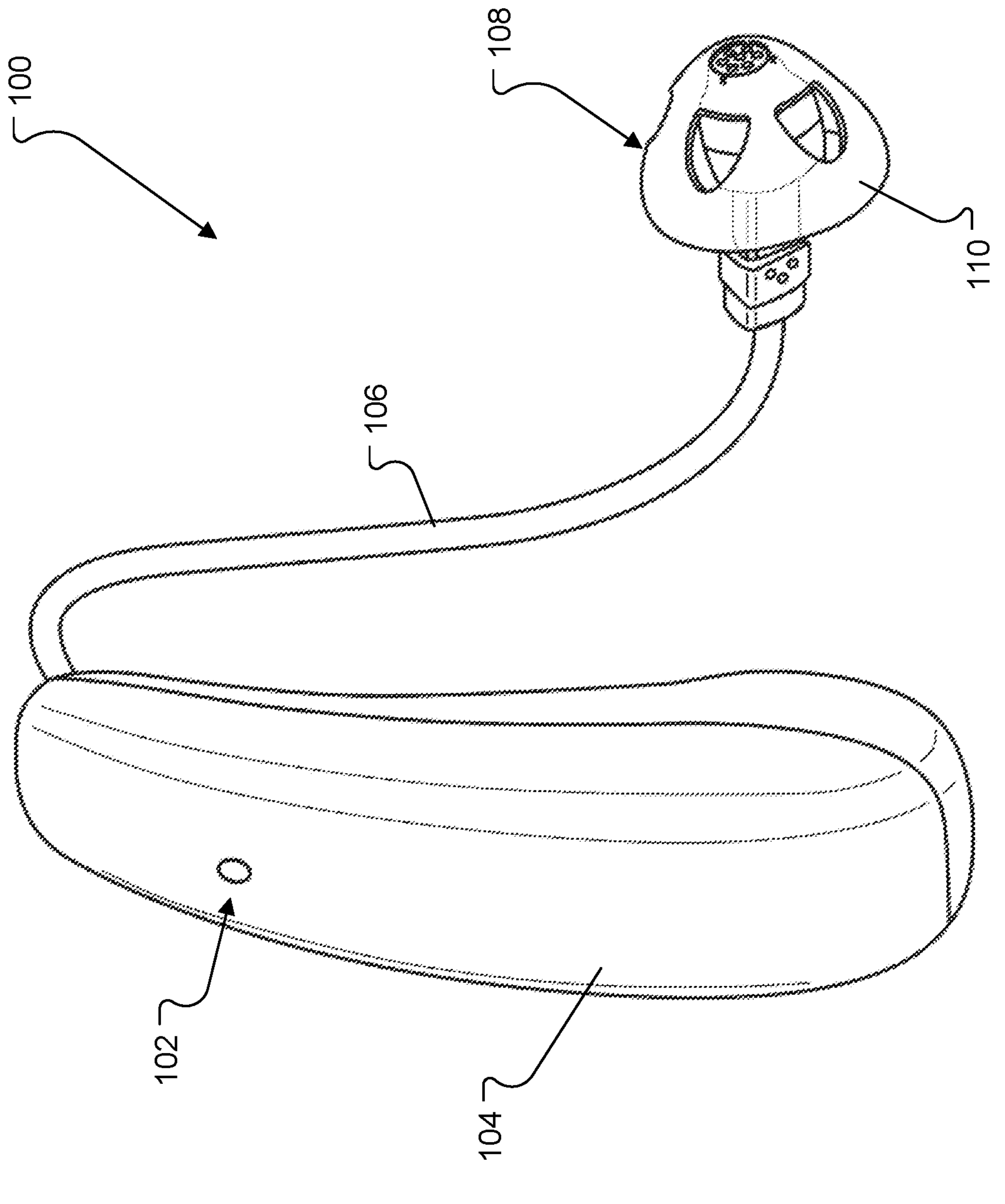
FIG. 1 is a perspective view of a typical receiver-in-canal (RIC) hearing aid.
Figure 2:
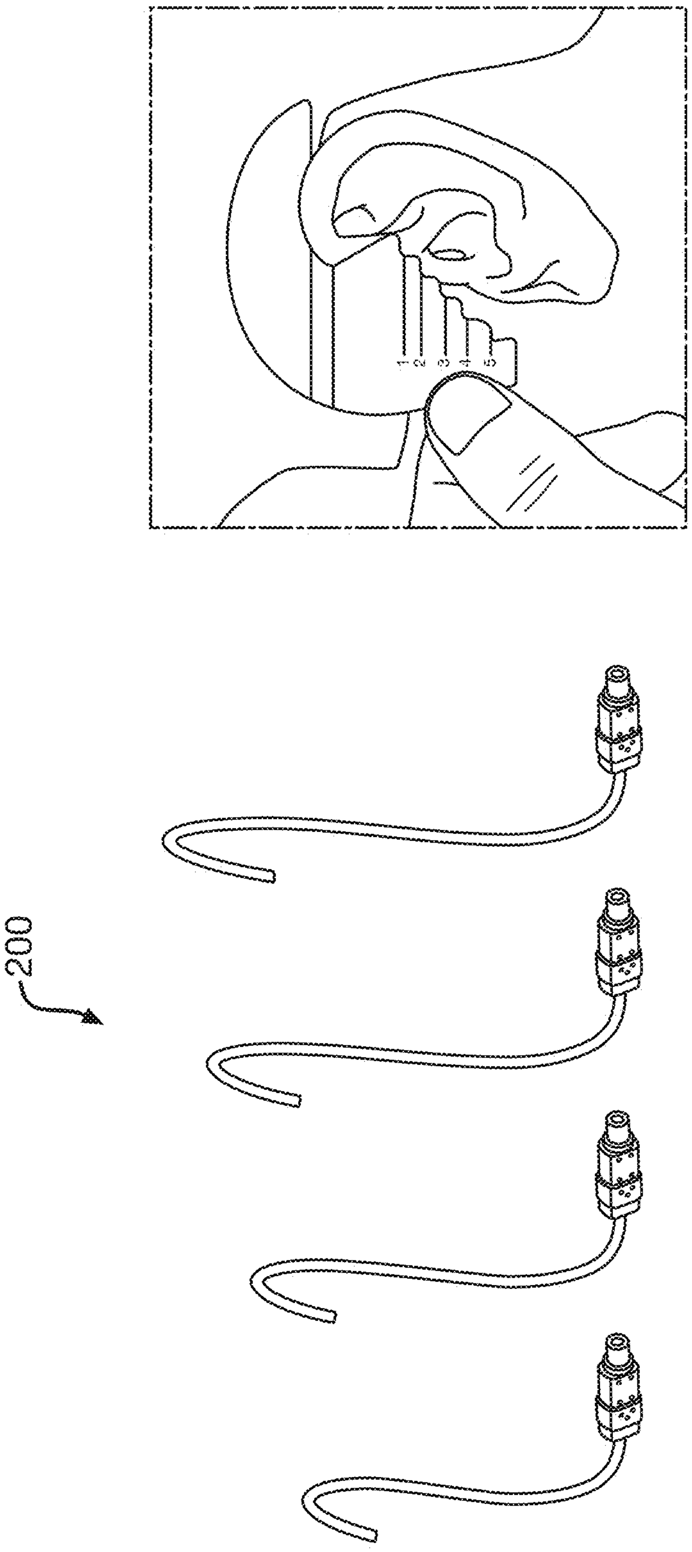
FIG. 2 is a set of manufacturer-provided wires (left) and measurement (right) for a hearing aid.
Figure 3:
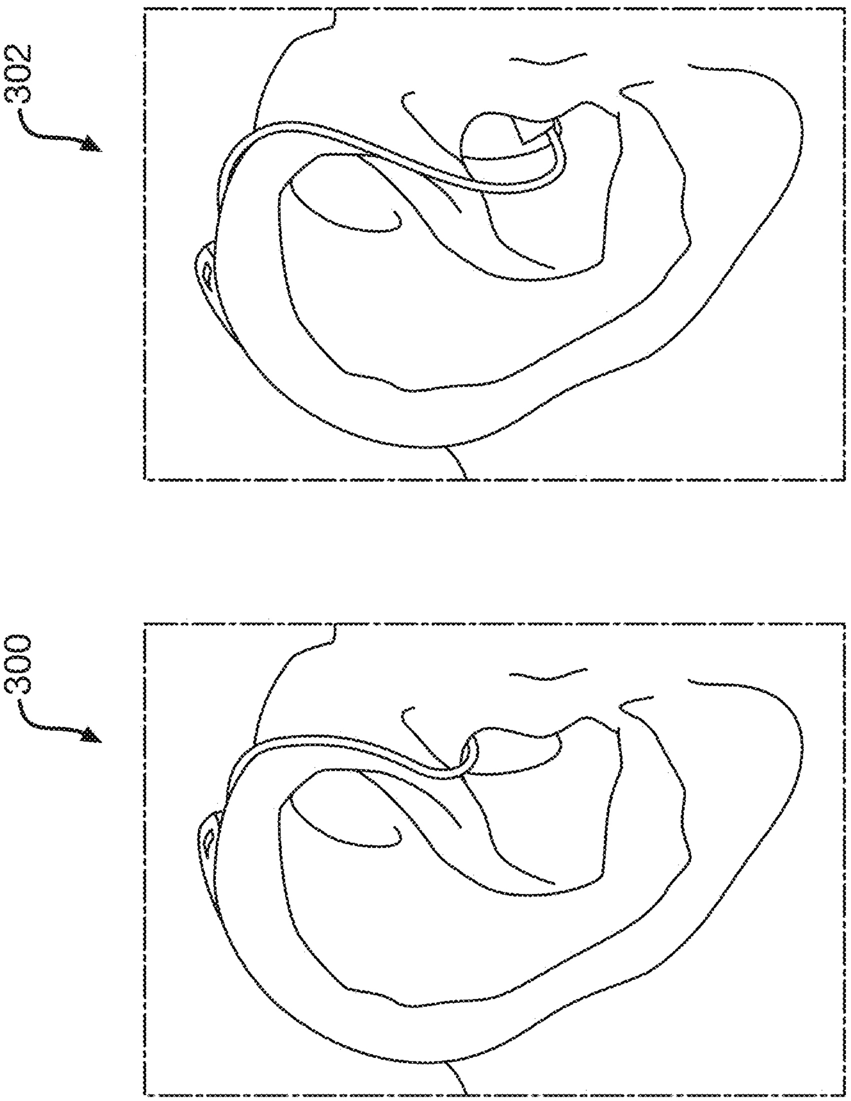
FIG. 3 is an example of a small ear with a hearing aid having a correctly fit wire (left) and a wire that is too long (right).
Figure 4:
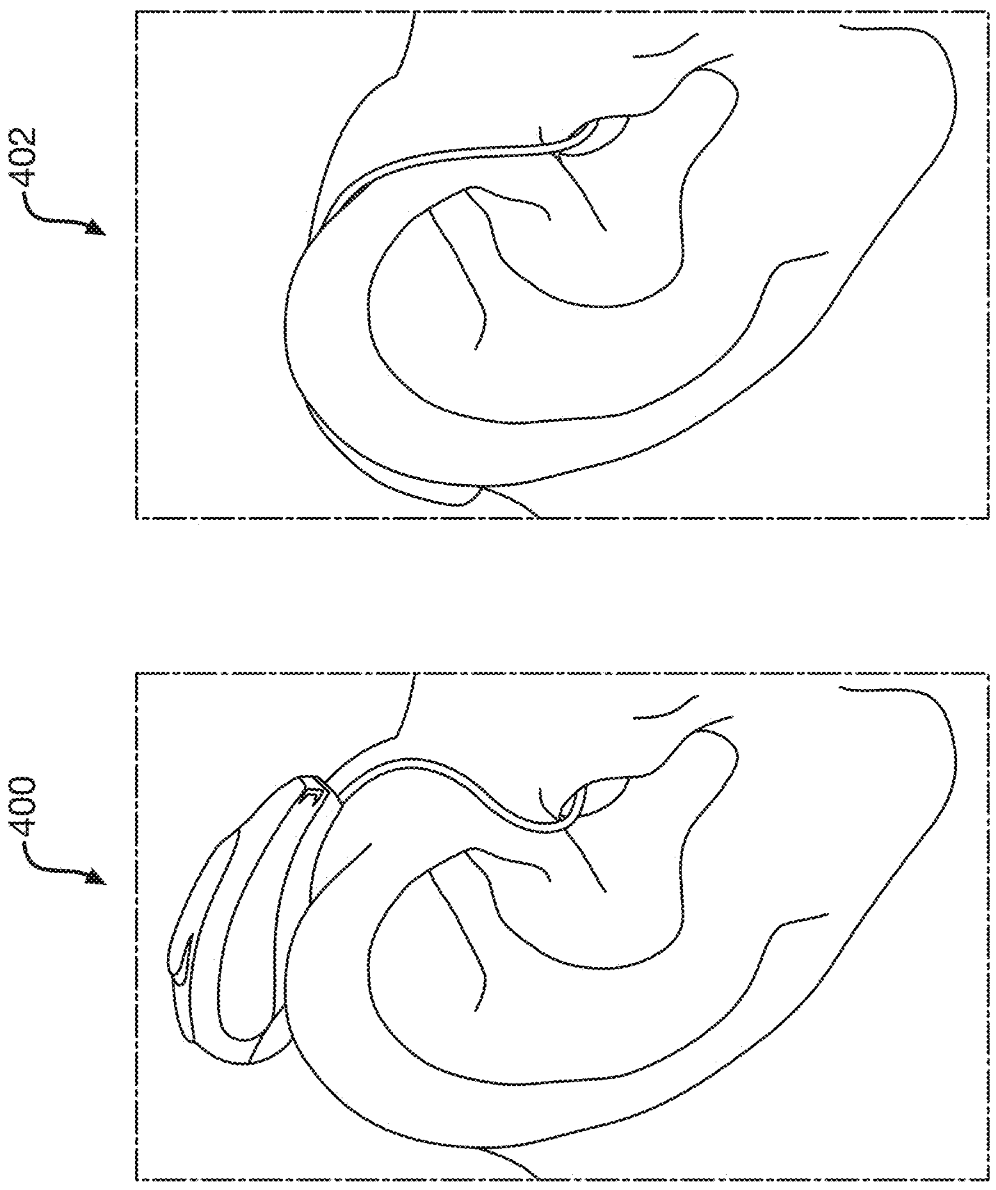
FIG. 4 is an example of a larger ear with a hearing aid having a wire that is too short (left) and a correctly fit wire (right).
Figure 7:
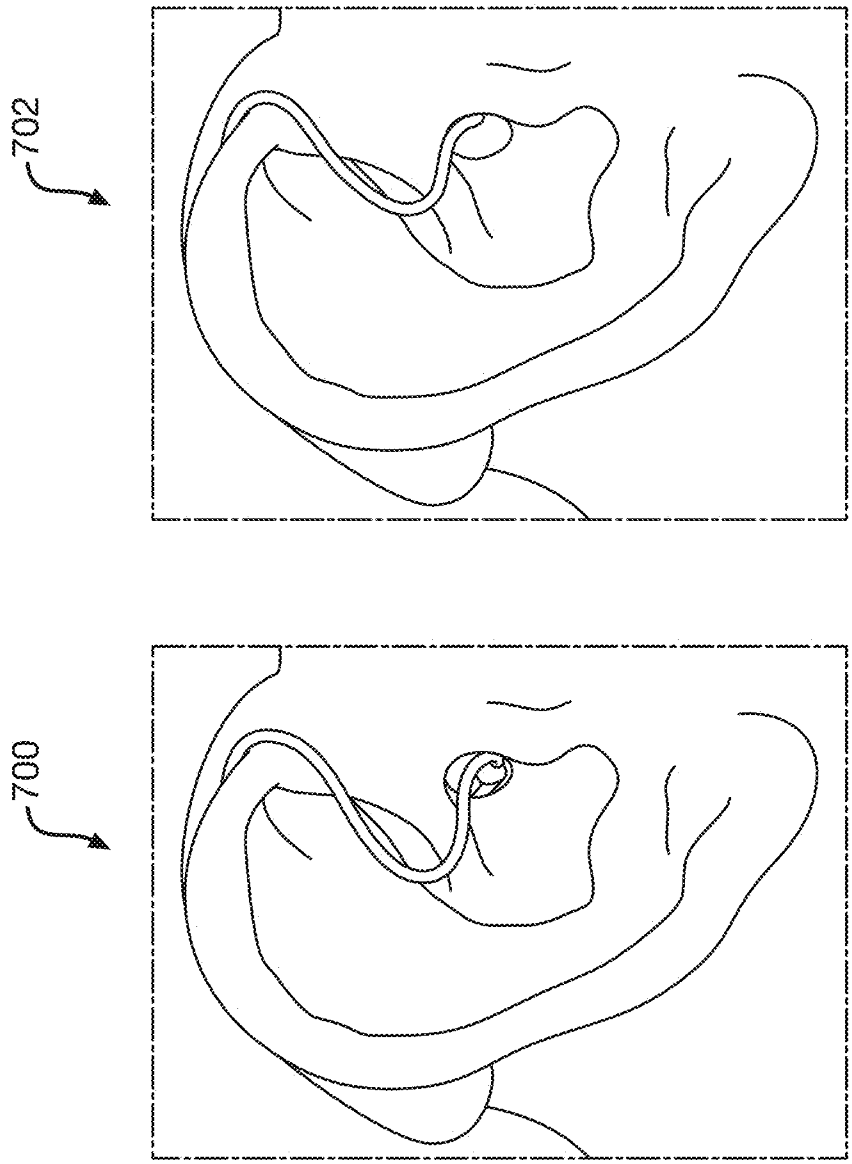
FIG. 7 shows the hearing aid of FIG. 6 being used to accommodate both a small ear (left) and large ear (right) while maintaining comfort and stability.

This coupling member 612, in its undeformed shape, securely fits a small ear 700 (left), but allows enough stretching to accommodate a larger ear 702 (right) too as shown in FIG. 7 with the same ears used in FIG. 3 and FIG. 4.

The implementation illustrated in FIG. 6 may be utilized in either a RIC style hearing aid or a BTE style hearing aid. In the case of a RIC style hearing aid, the coupling member 612 may comprise electrically conductive wiring; e.g., a pair of electrically conductive wires contained in a conduit, e.g., a polymeric sleeve or tube, that enables the transmission of electrical energy from the casing 604 to the receiver in the earpiece 602. In this case, the spring-like bends may be formed in the electrically insulated sleeve or tube that surrounds the wires, and/or in the conductive wires themselves.

Alternatively, in the case of a BTE style hearing aid, the coupling member 612 may comprise a tube (e.g., a polymeric tube) that enables the transmission of acoustic energy from the receiver in the casing 604 to the earpiece. In this case, the spring-like bends may be formed in the tube.

Figure 8:
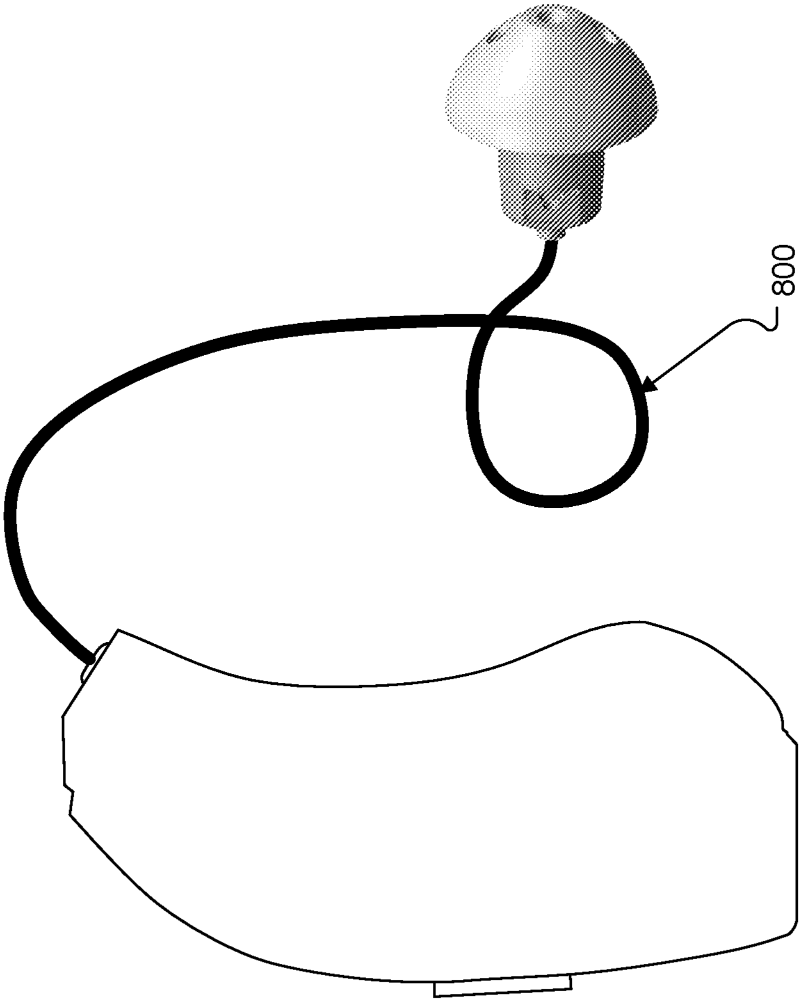
FIG. 8 is a schematic side view of a hearing aid having a coupling member with an integrated spring in the form of a loop.

While an S-shaped coupling member is shown and described with respect to FIG. 6, in other implementations, the coupling member may be provided with an integral spring in the form of a loop 800, as shown in FIG. 8, which provides tension in the wire to keep the device in place, particularly on smaller ears, and allows the coupling member to extend in length to accommodate larger ears. The integrated spring may have a spring constant of 200 to 400 Newtons per meter (N/m).

Figure 9:
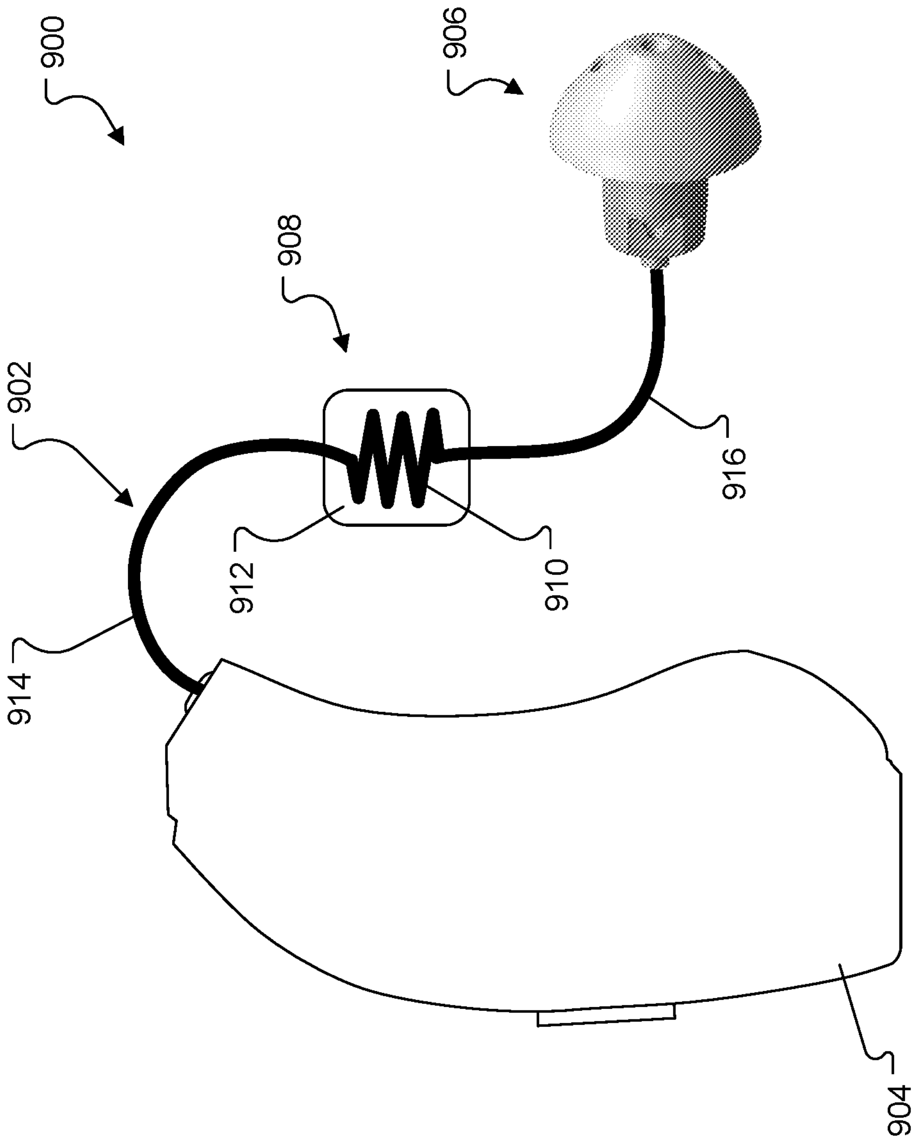
FIG. 9 is a schematic side view of a hearing aid having a coupling member with an integrated spring in the form of a coiled section encased in an elastomer.

FIG. 9 illustrates another example of a hearing aid 900 in which the coupling member 902 connecting a casing 904 of a behind-the-ear portion and an earpiece 906 includes a first portion 908 that includes a coiled coupling section 910 that is encased in an elastomer 912. The elastomer 912 provides some compliance allowing the coiled coupling section 910 to be stretched so that the hearing aid 900 can better fit larger ears, while contracting to eliminate slack in the wire for smaller ears. Suitable elastomers include TPU or silicone.

A second portion 914 of the coupling member 902 is disposed between the coiled coupling section 910 and the casing 904. The second portion 914 may be formed integrally with the coiled coupling section 910.

A third portion 916 of the coupling member 902 is disposed between the coiled coupling section 910 and the earpiece 906. The third portion 916 may be formed integrally with the coiled coupling section 910.

In the case of a RIC style hearing aid, the coiled coupling section 910 may comprise electrically conductive wiring; e.g., a pair of electrically conductive wires contained in a conduit, e.g., a polymeric sleeve or tube, that enables the transmission of electrical energy from the casing 904 to a receiver in the earpiece 906. In this case, the coils in the coiled coupling section 910 may be formed in the electrically insulated sleeve or tube that surrounds the wires, and/or in the conductive wires themselves. As mentioned above, the second and third portions 914, 916 of the coupling member 902 may be formed integrally with the coiled coupling section 910 such that the coupling member 902 includes wiring, e.g., a pair of electrically conductive wires, contained in a conduit, e.g., a polymeric sleeve or tube, that extends from the casing 904 at one end to the earpiece 906 at its opposite end with the coiled coupling section 910 being formed between the two ends.

Alternatively, in the case of a BTE style hearing aid, the coiled coupling section 910 may comprise a tube (e.g., a polymeric tube) that enables the transmission of acoustic energy from the receiver in the casing 904 to the earpiece. In this case, the coils in the coiled coupling section may be formed in the tube. The second and third portions 914, 916 of the coupling member 902 may be formed integrally with the coiled coupling section 910 out of the same piece of tubing.

In some cases, the coiled coupling section 910 may be configured to act as a tension spring thereby allowing the coiled coupling section 910 to be stretched so that the hearing aid 900 can better fit larger ears, while contracting under its own spring force to eliminate slack in the wire for smaller ears, and, thereby, potentially obviating any need for the elastomer.

Figure 10:
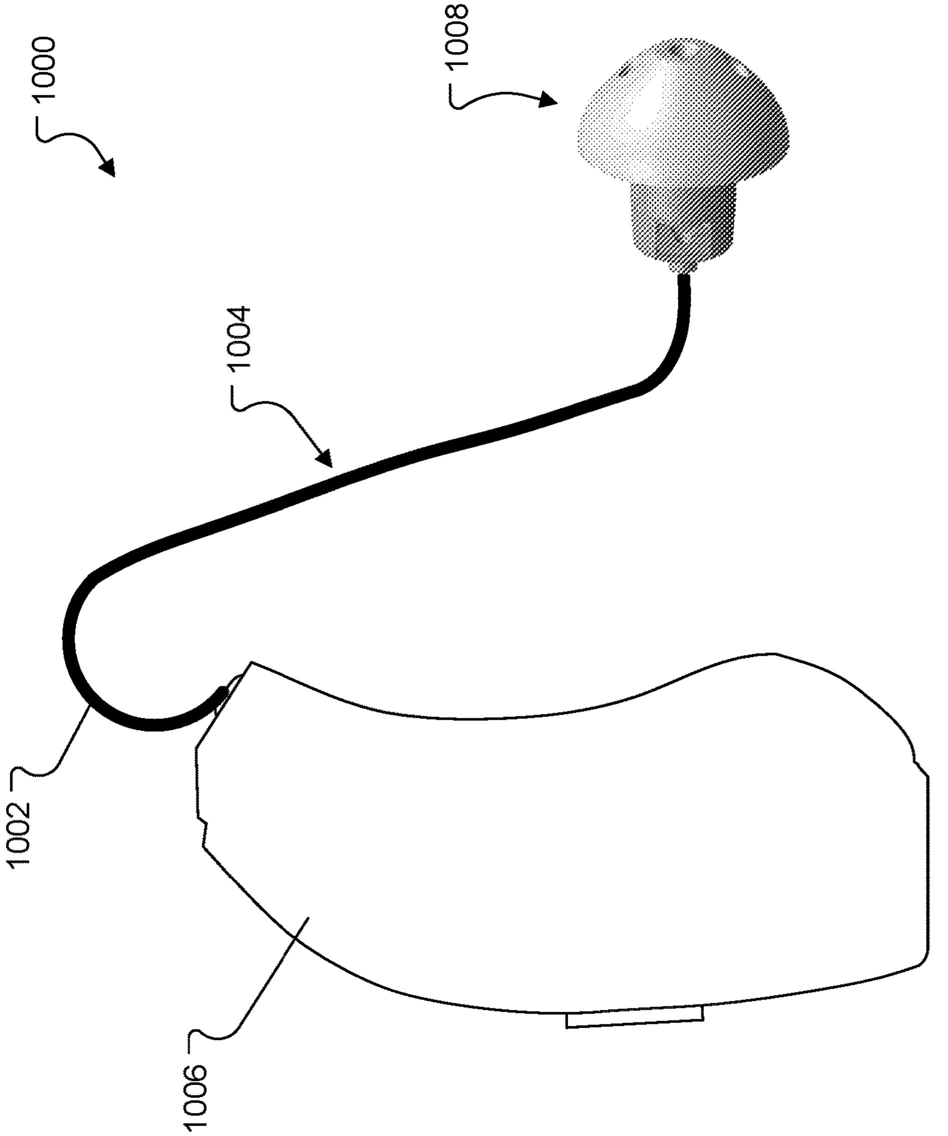
FIG. 10 is a schematic side view of a hearing aid having a coupling member with an integrated spring in the form of a rotational spring.

FIG. 10 illustrates yet another implementation of a hearing aid 1000 in which a rotational spring 1002 is integrated into a coupling member 1004, e.g., at the point where the coupling member 1004 is joined to a casing 1006. The rotational spring 1002 allows the coupling member 1004 to be stretched so that the hearing aid 1000 can better fit larger ears, while contracting under its own spring force to eliminate slack in the wire for smaller ears.

In the case of a RIC style hearing aid, the rotational spring 1002 may be formed by the conduit (e.g., polymeric tube) containing the electrically conductive wires, and/or by the electrically conductive elements themselves.

For a BTE style hearing aid, the rotational spring 1002 may be formed by the tube that conducts acoustic energy between the casing 1006 and the earpiece 1008.

Sliding Sections

Figure 11:
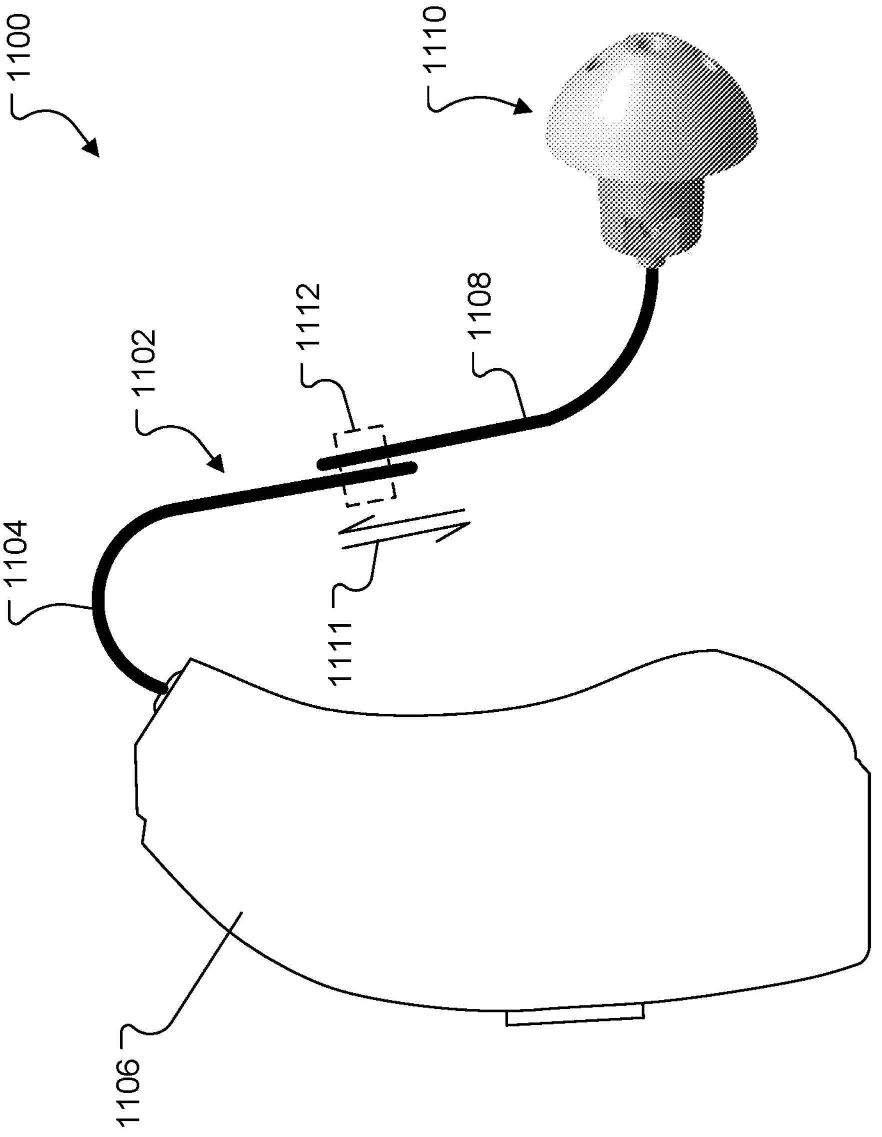
FIG. 11 is a schematic side view of a hearing aid having an adjustable length coupling member with slidable sections.

FIG. 11 illustrates an implementation of a RIC style hearing aid 1100 that accommodates user's with different ear geometries by incorporating electrical conductor portions that are slidable relative to each other to adjust the effective length of the coupling member 1102. In that regard, the coupling member 1102 includes a first conductor portion 1104 that is electrically coupled to electronics enclosed in the casing 1106 and is mechanically coupled to the casing 1106. A second conductor portion 1108 is electrically coupled to a receiver in the earpiece 1110 and is mechanically coupled to the earpiece 1110. The first and second conductor portions 1104, 1108 are slidable (arrows 1111) relative to each other and are configured to maintain an electrical connection therebetween as they are displaced. To help maintain the electrical connection between the first and second conductor portions 1104, 1108, the first and second conductor portions 1104,1108 may be held in close contact with each other, e.g., via a surrounding tube or a loop. In some cases, the first and/or second conductor portions 1104, 1108 may be provided with a protrusion that projects outwardly toward the other one of the first and second conductor portions 1104, 1108 to assist in establishing/maintaining the electrical contact therebetween. Such a protrusion may be arranged to slide up and down a length of the adjacent conductor portion to ensure good electrical contact regardless of the relative position of the first and second conductor portions 1104, 1108.

Alternatively, or additionally, the first and/or second conductor portion 1104, 1108 may be slidably received within an electrical connector 1112, and the electrical connector 1112 may assist in establishing and/or maintaining an electrical connection between the first and second conductor portions 1104, 1108.

Telescoping Jacket

Figure 12:
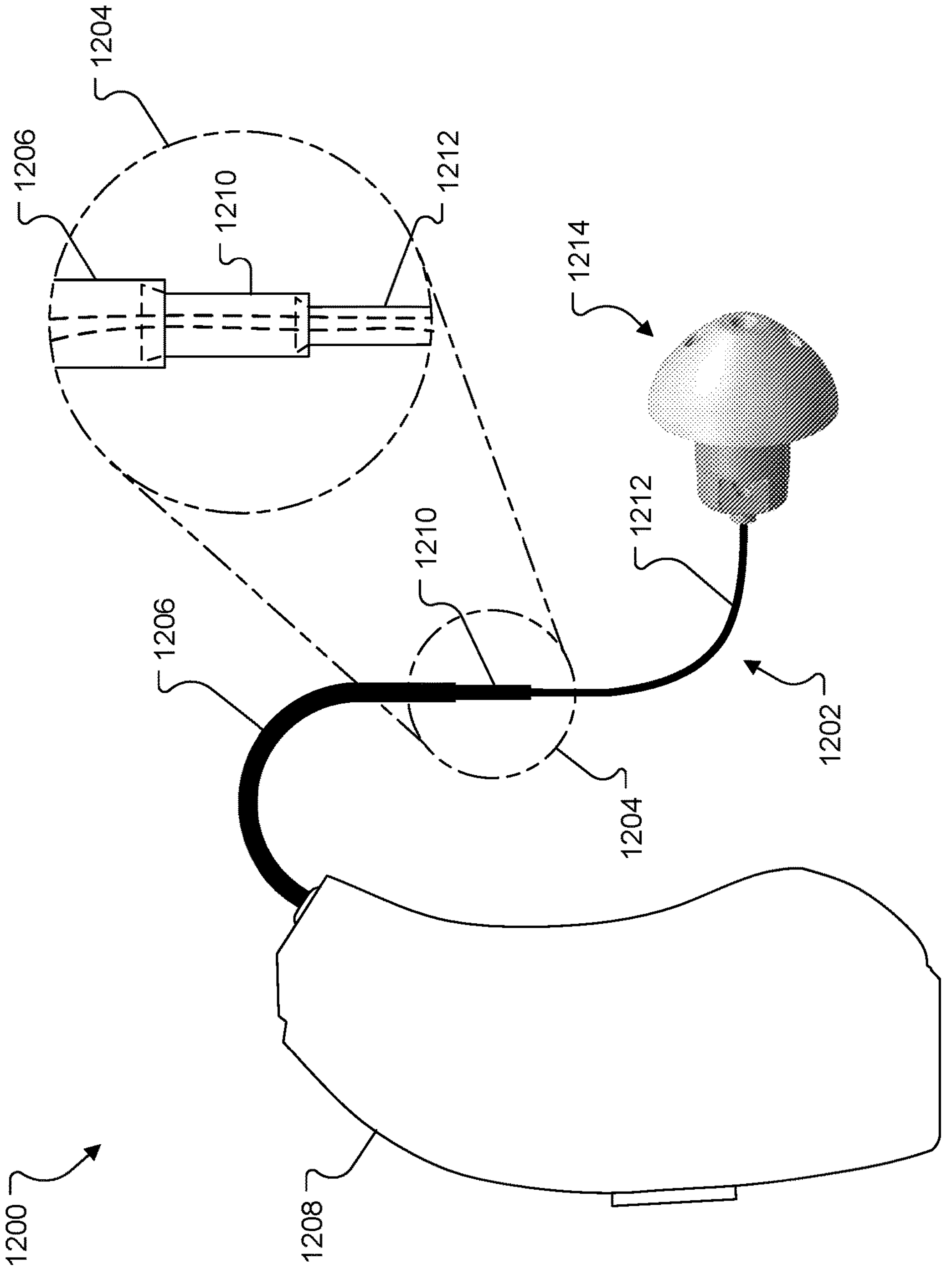
FIG. 12 is a schematic side view of a hearing aid having an adjustable length coupling member with telescoping sections.

FIG. 12 illustrates another implementation of a hearing aid 1200 in which a coupling member 1202 is provided with telescoping section 1204 that is operable to adjust its effective length. In the illustrated example, the telescoping section 1204 has three distinct portions including a first portion 1206 that is coupled to the casing 1208; a second portion 1210 that is slidably received within the first portion 1206; and a third portion 1212 that is coupled an ear piece 1214 and slidably received within the second portion 1210. The first, second, and third portions 1206, 1210, 1212 may be formed of discrete pieces of polymeric tubing having contrasting diameters. The length of the coupling member 1202 is adjustable between a fully collapsed position, for a small ear, and a fully extended position, for a larger ear.

In the fully collapsed position, the second portion 1210 may be fully received within the first portion 1206 and the third portion 1212 may be fully received in the second portion 1210.

In the fully extended position, the second portion 1210 extends outwardly from the first portion 1206 by a maximum amount and the third portion 1212 extends outwardly from the second portion 1210 by a maximum amount.

Intermediate lengths are achieved by extending the second portion 1210 outwardly of the first portion 1206 only partially, and/or by extending the third portion 1212 outwardly from the second portion 1210 only partially.

In the case of a RIC style hearing aid, the telescoping section 1204 may surround wiring that extends between the casing 1208 and the earpiece 1214 for powering a receiver in the earpiece 1214. Excess wiring (slack) in the fully collapsed position, or a partially collapsed position, may be accommodated in the tubing forming the telescoping section 1204 and/or in the casing 1208.

In the case of a BTE style hearing aid, the tubing forming the telescoping section 1204 may also be used to transfer acoustic energy from a receiver in the casing 1208 to the earpiece 1214.

Links

Figure 13A:
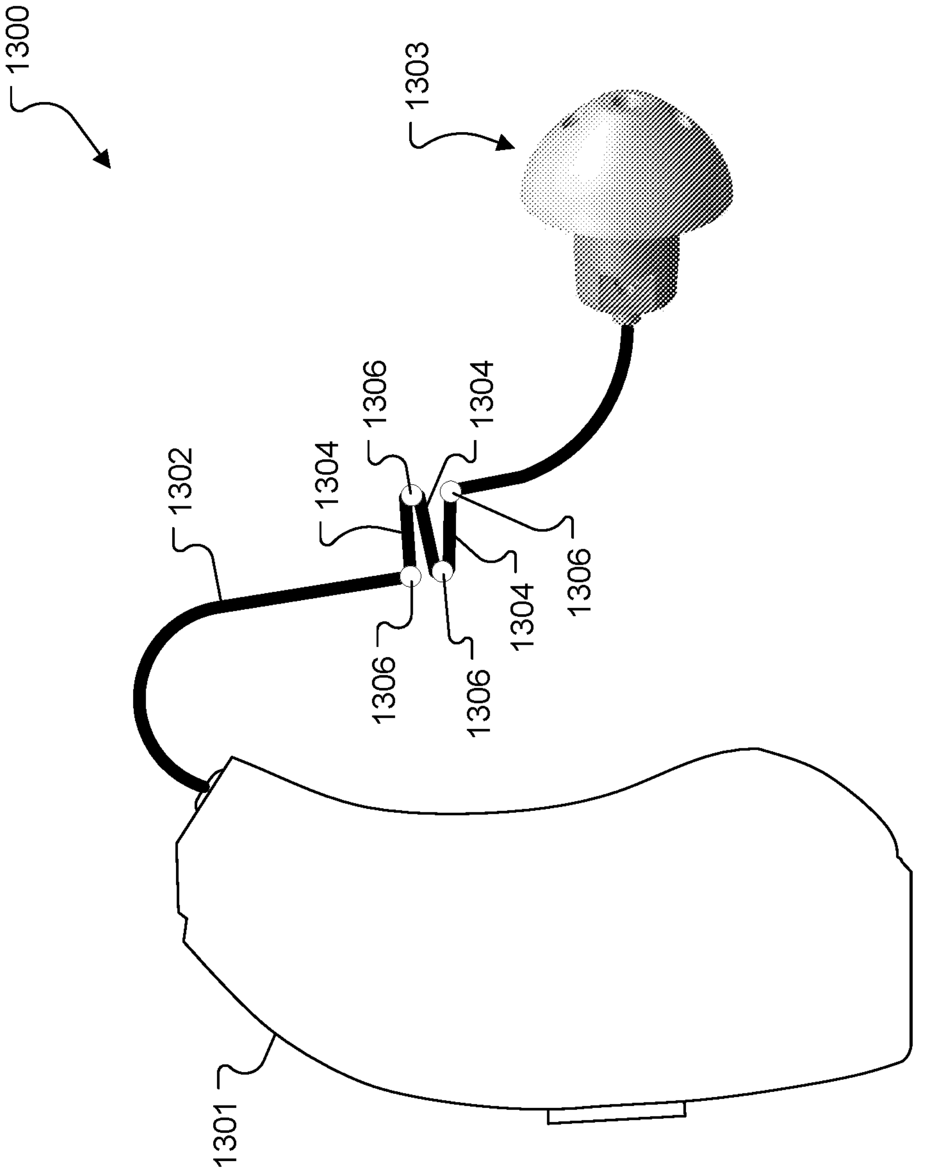
FIGS. 13A and 13B are schematic side views of a hearing aid having an adjustable length coupling member with links.
Figure 13B:
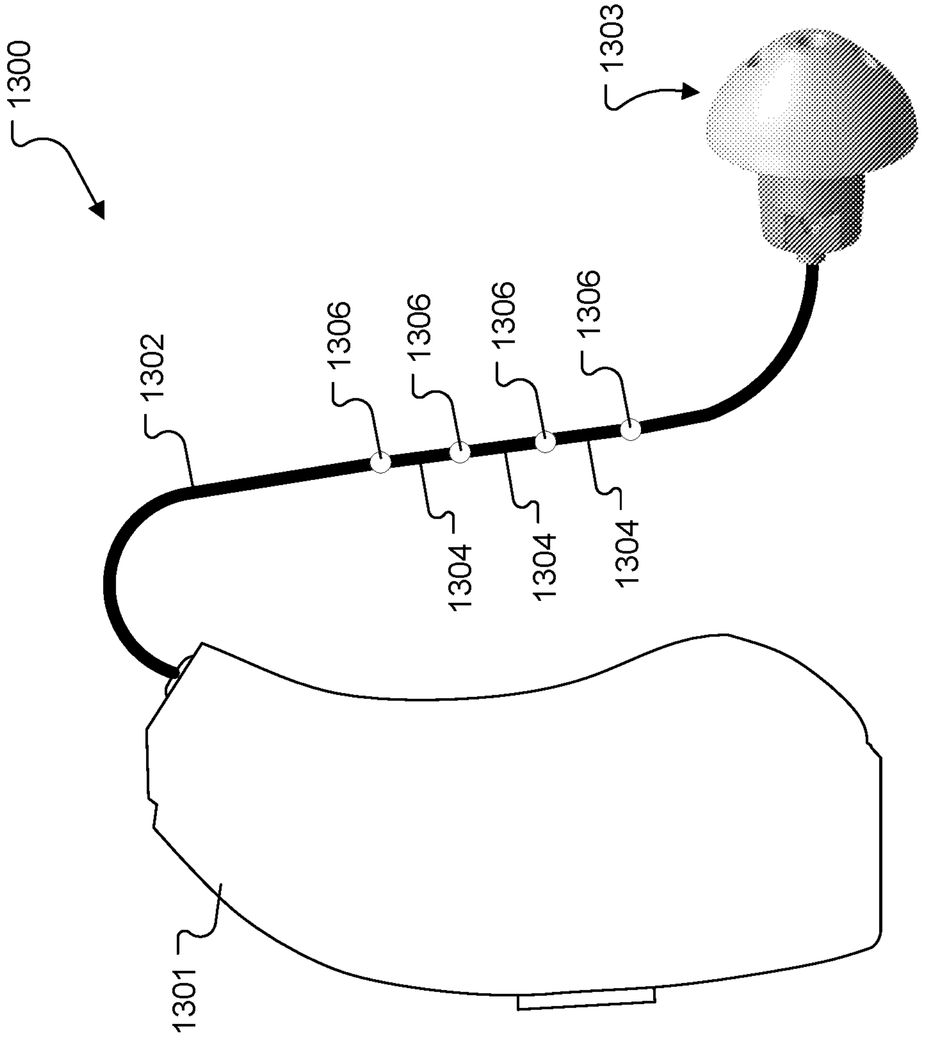

FIGS. 13A & 13B illustrate another implementation of a hearing aid 1300 in which a coupling member 1302, extending between a casing 1301 and an earpiece 1303, includes a plurality of links 1304 that are hinged together at joints 1306. The links 1304 can be folded on top of one another to shorten the effective length of the coupling member 1302 as shown in FIG. 13A, or one or more of the links 1304 can be unfolded to increase the effective length of the coupling member 1302. as shown in FIG. 13B.

Expandable/Collapsible Corrugations

Figure 14A:
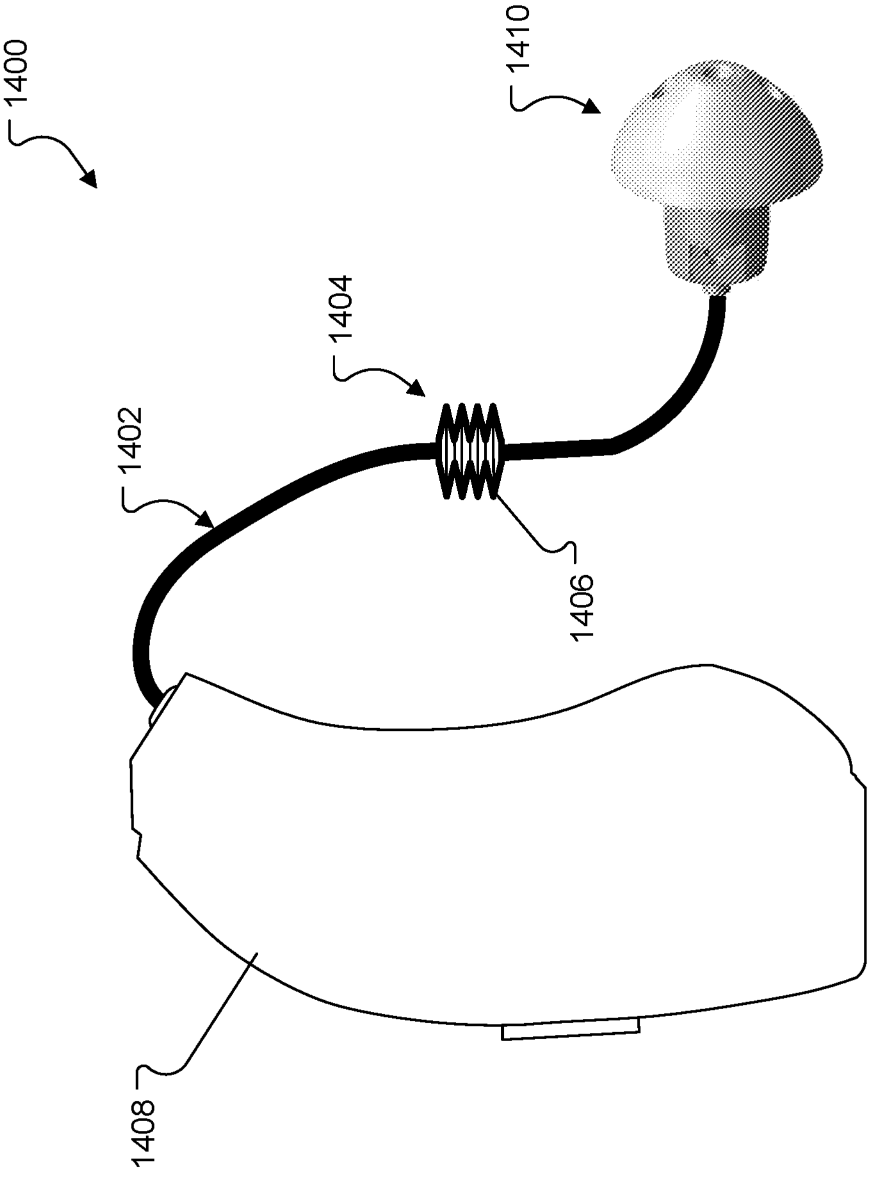
FIGS. 14A and 14B are schematic side views of a hearing aid having an adjustable length coupling member with an expandable/collapsible corrugated section.
Figure 14B:
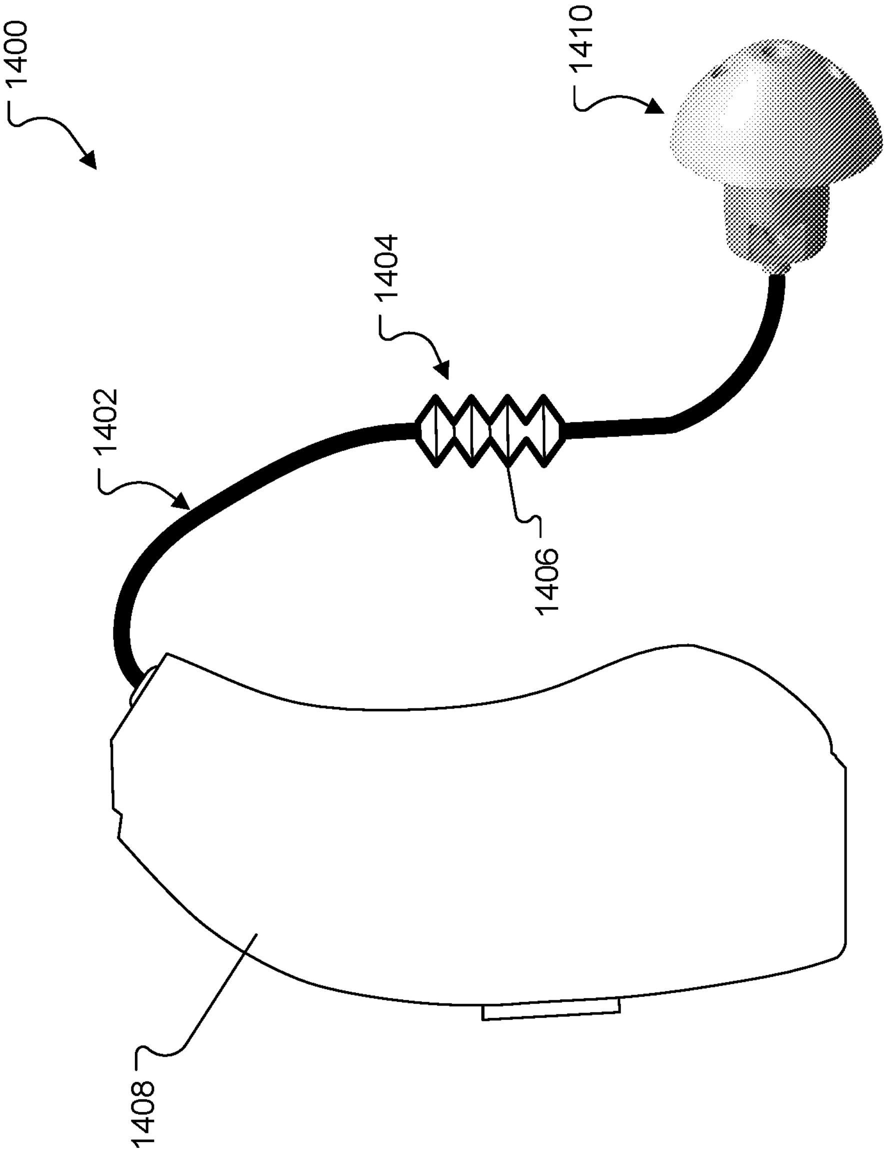

FIGS. 14A & 14B illustrates yet another implementation of a hearing aid 1400 in which a coupling member 1402 is provided with a corrugated section 1404 similar to what may be found on conventional flexible drinking straws. The corrugated section 1404 includes a series of corrugations 1406 that can be collapsed on themselves to shorten the effective length of the coupling member 1402 (FIG. 14A), or may be extended, e.g., by applying a force at either end of the coupling member 1402 to increase the effective length of the coupling member 1402 (FIG. 14B). As in the implementations described above, in a RIC style hearing aid, the coupling member 1402 may support wiring for delivering an electrical signal from the casing 1408 to the earpiece 1410. Alternatively, in a BTE style hearing aid, the coupling member 1402 may be configured to deliver acoustic energy from the casing 1408 to the earpiece 1410.

Shape Memory Alloy

Figure 15B:
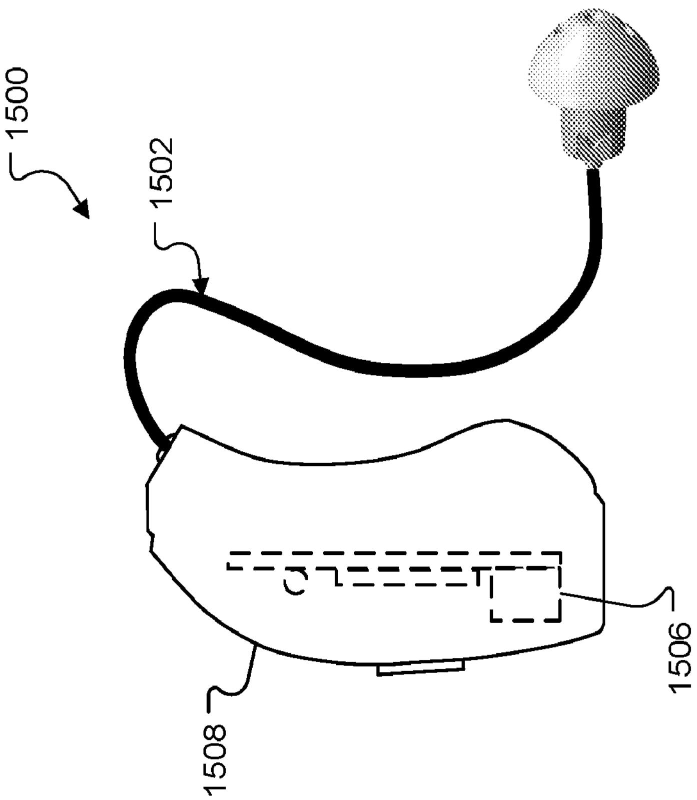
FIGS. 15A and 15B are schematic side views of a hearing aid having an adjustable length coupling member with a shape memory material to allow a pre-strained configuration to extend when heated/when current is applied.
Figure 15A:
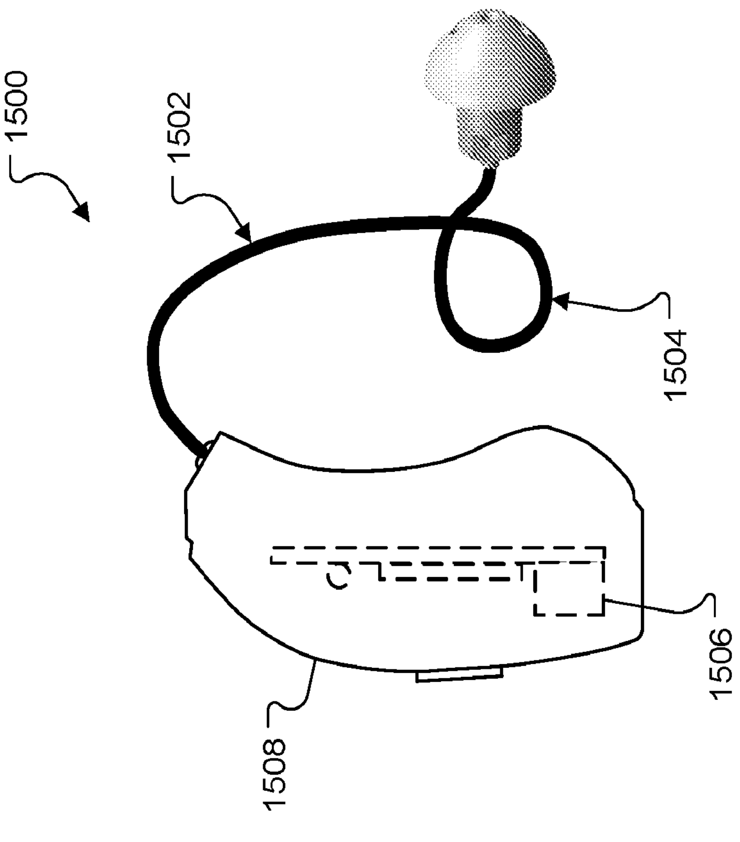

In yet another implementation of a hearing aid 1500, illustrated in FIGS. 15A and 15B, a coupling member 1502 may include a shape memory alloy that allows a pre-strained wire to extend when heated. For example, FIG. 15A shows the coupling member 1502 as formed with a loop 1504. FIG. 15B shows the shape of the coupling member 1502 with current applied. The effective length of the coupling member 1502 is thus controlled by applying currently to eliminate the loop and thereby increase the effective length of the coupling member. In some cases, a current for adjusting the shape and length of the coupling member 1502 may be applied by electronics 1506 housed within the casing 1508.

Removable Spacers

Figure 16:
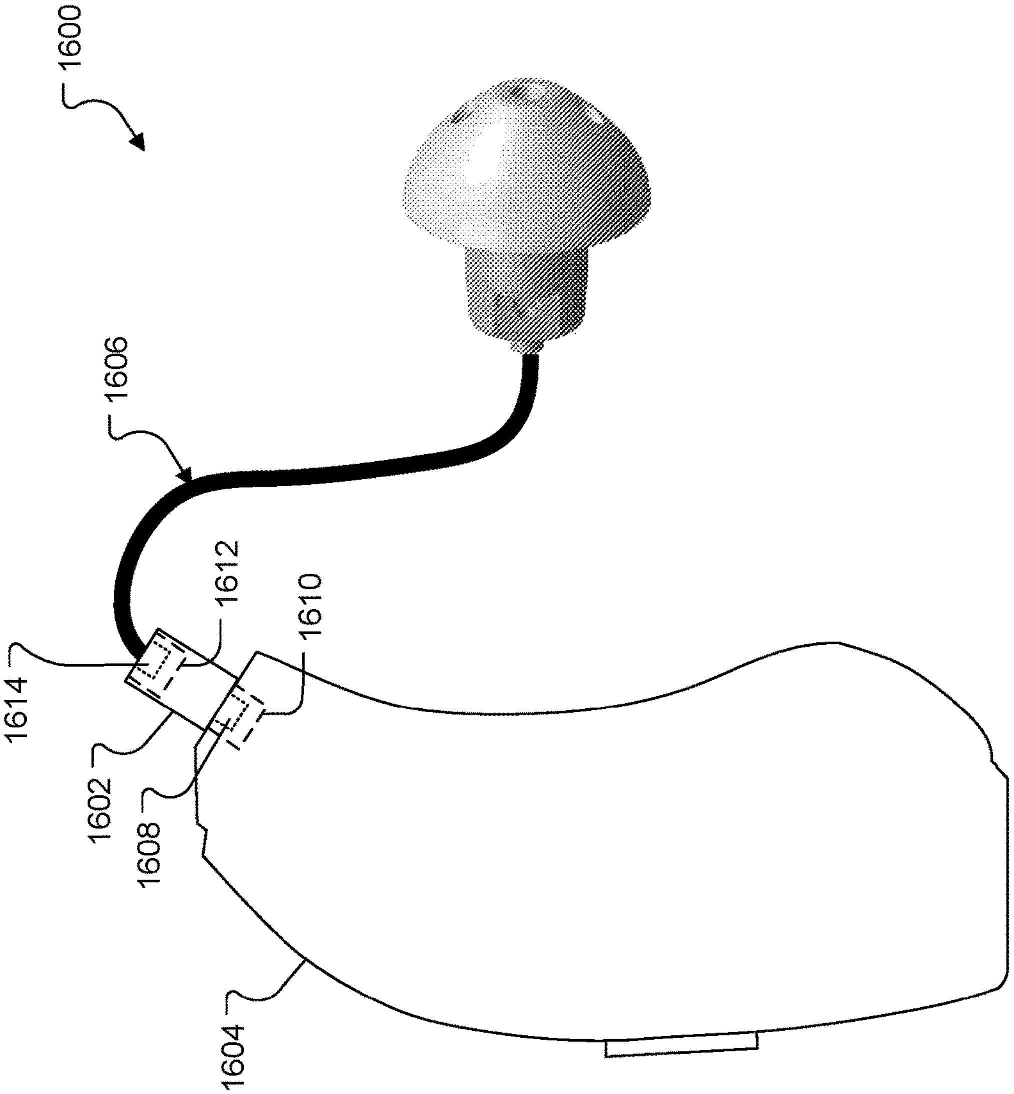
FIG. 16 is a schematic side view of a hearing aid that uses a removable spacer in the form of a double-sided connector for adjusting an effective length of a coupling member.

In other implementations, spacers may be used to extend the effective length of the coupling member. For example, FIG. 16 illustrates an implementation of a hearing aid 1600 that includes a double-sided connector 1602 that is arranged between the casing 1604 and the coupling member 1606. In one example, the double-sided connector 1602 includes a male side 1608 that may be coupled to a female connector 1610 on the casing 1604, and a female side 1612 that may receive a male connector 1614 arranged on an end of the coupling member 1606. Additional double-sided connectors may be added to further increase the effective length of the coupling member 1606.

Figure 17A:
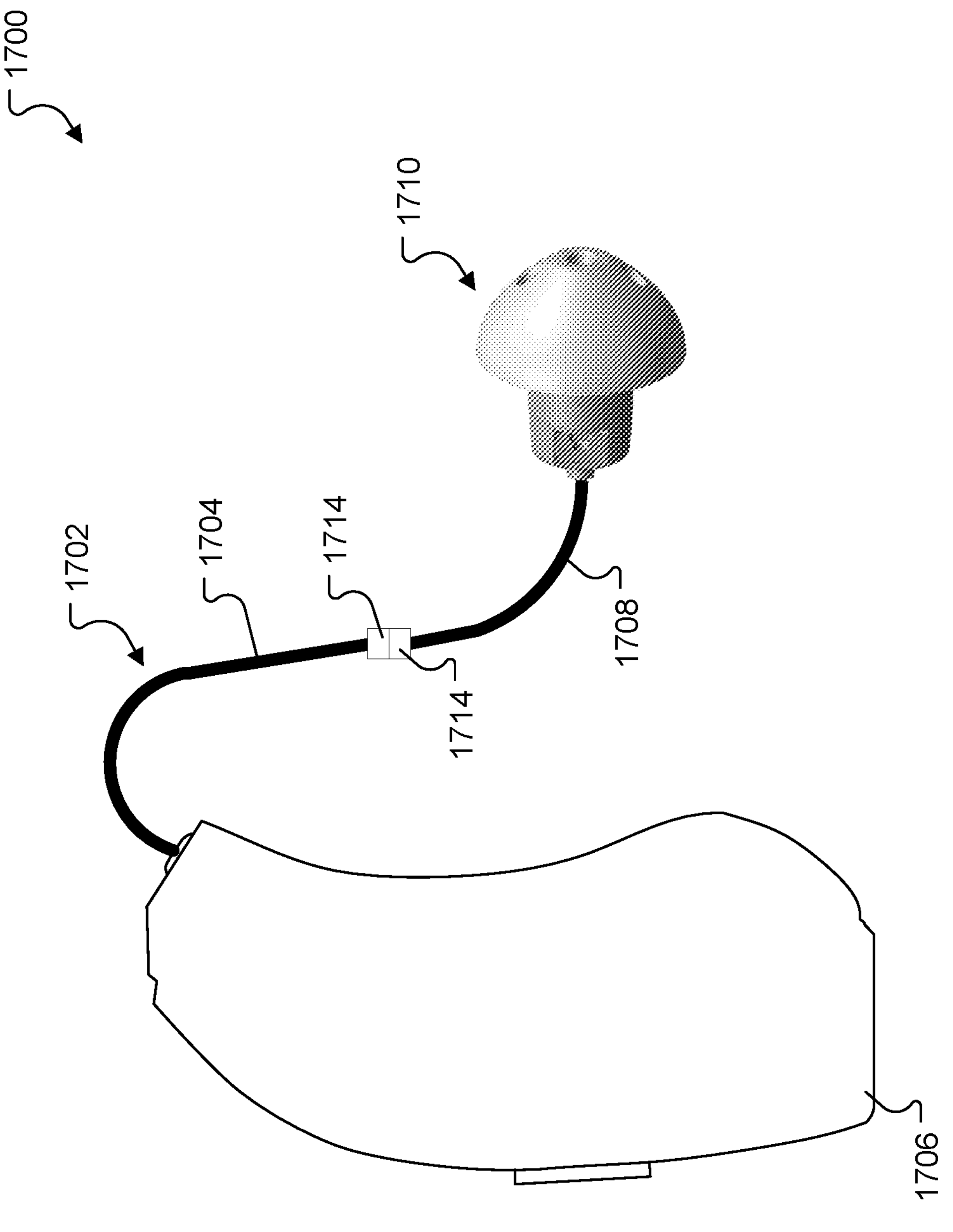
FIGS. 17A and 17B are schematic side views of a hearing that user removable spacers in the form of removable wire/tube segments for adjusting for adjusting an effective length of a coupling member.
Figure 17B:
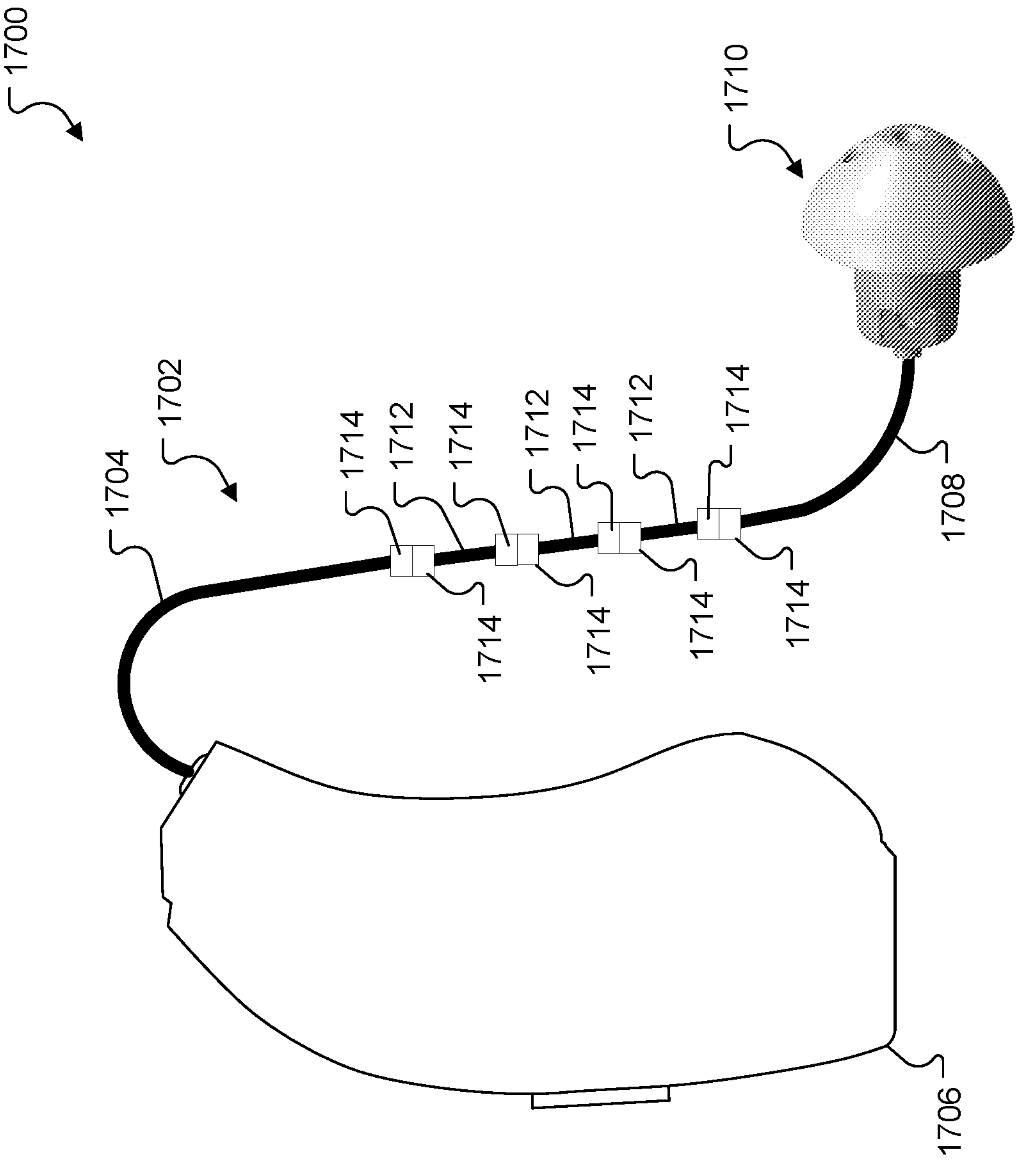

Still, in another implementation of a hearing aid 1700, a coupling member 1702 may include a plurality of segments, such as shown in FIGS. 17A and 17B. With reference to FIG. 17A, the coupling member 1702 includes a first segment 1704 that is configured to be coupled to the casing 1706, and a second segment 1708 that is coupled to the earpiece 1710. As shown in FIG. 17A, the first segment 1704 may be coupled directly to the second segment 1708 to provide a shortest length coupling member 1702. Alternatively, as shown in FIG. 17B, the first segment 1704 may be coupled to the second segment 1708 via a plurality of intervening segments 1712 (3 shown). The segments may be coupled together, e.g., via electrical connectors 1714 arranged at the ends of the segments 1704, 1708, 1712.

Figure 18:
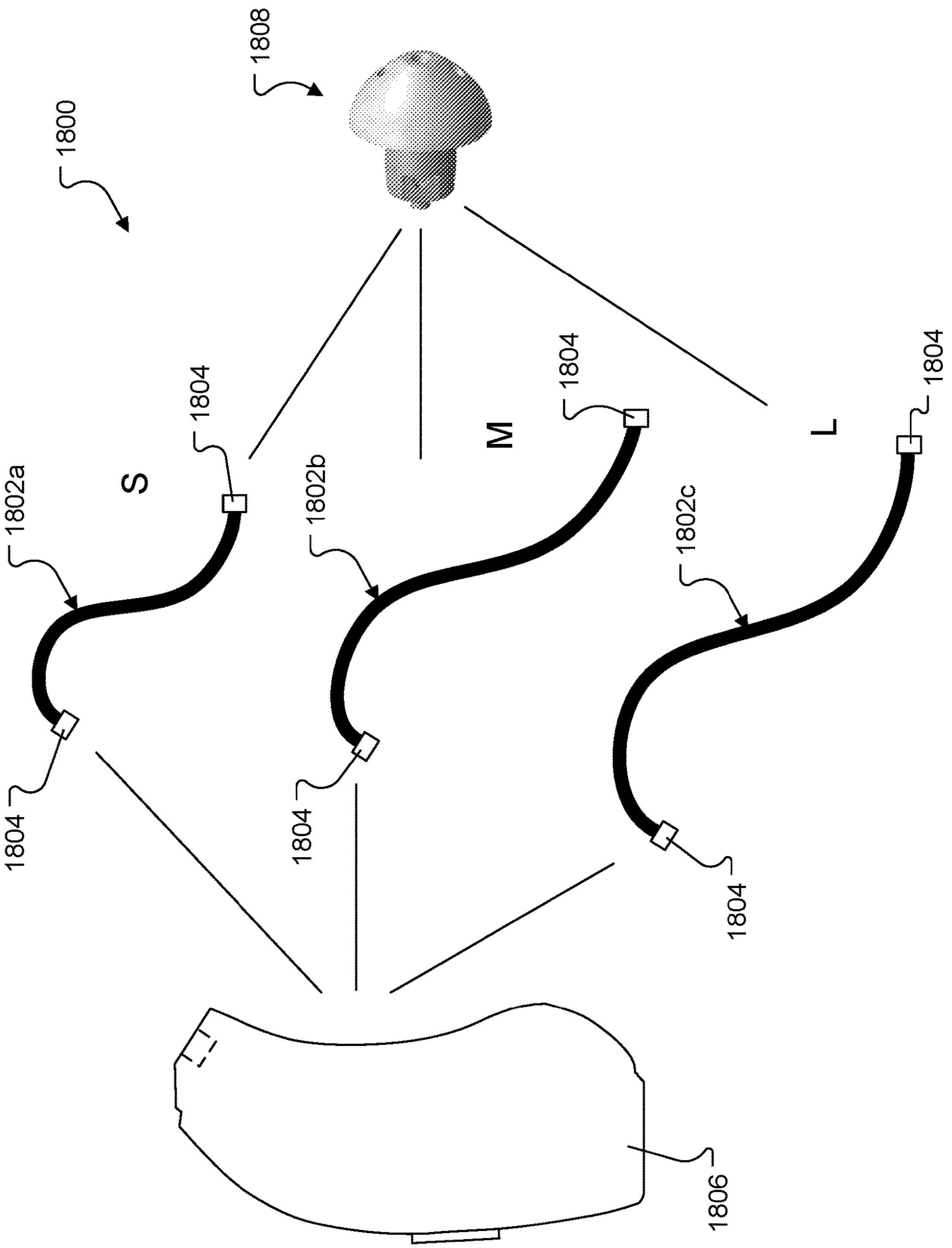
FIG. 18 is a schematic side view of a hearing aid that uses interchangeable couple members of contrasting length for adjusting the effective length.

Alternatively, as shown in FIG. 18, a hearing aid 1800 includes a coupling member 1802*a-c* (generally "1802") may be releasably coupled, e.g., via electrical connectors 1804 to both the casing 1806 and the earpiece 1808, and a plurality of coupling members 1802 of different sizes (e.g., small ("1802*a*"), medium ("1802*b*"), and large ("1802*c*")) may be provided. A user can select the size that most closely matched his/her ear geometry and then make the appropriate connection to the casing 1806 and the earpiece 1808. This does not eliminate the need to provide a plurality of coupling member sizes, but it does eliminate the need to provide a different earpiece for each size of coupling member 1802.

Slide Inside

Figure 19A:
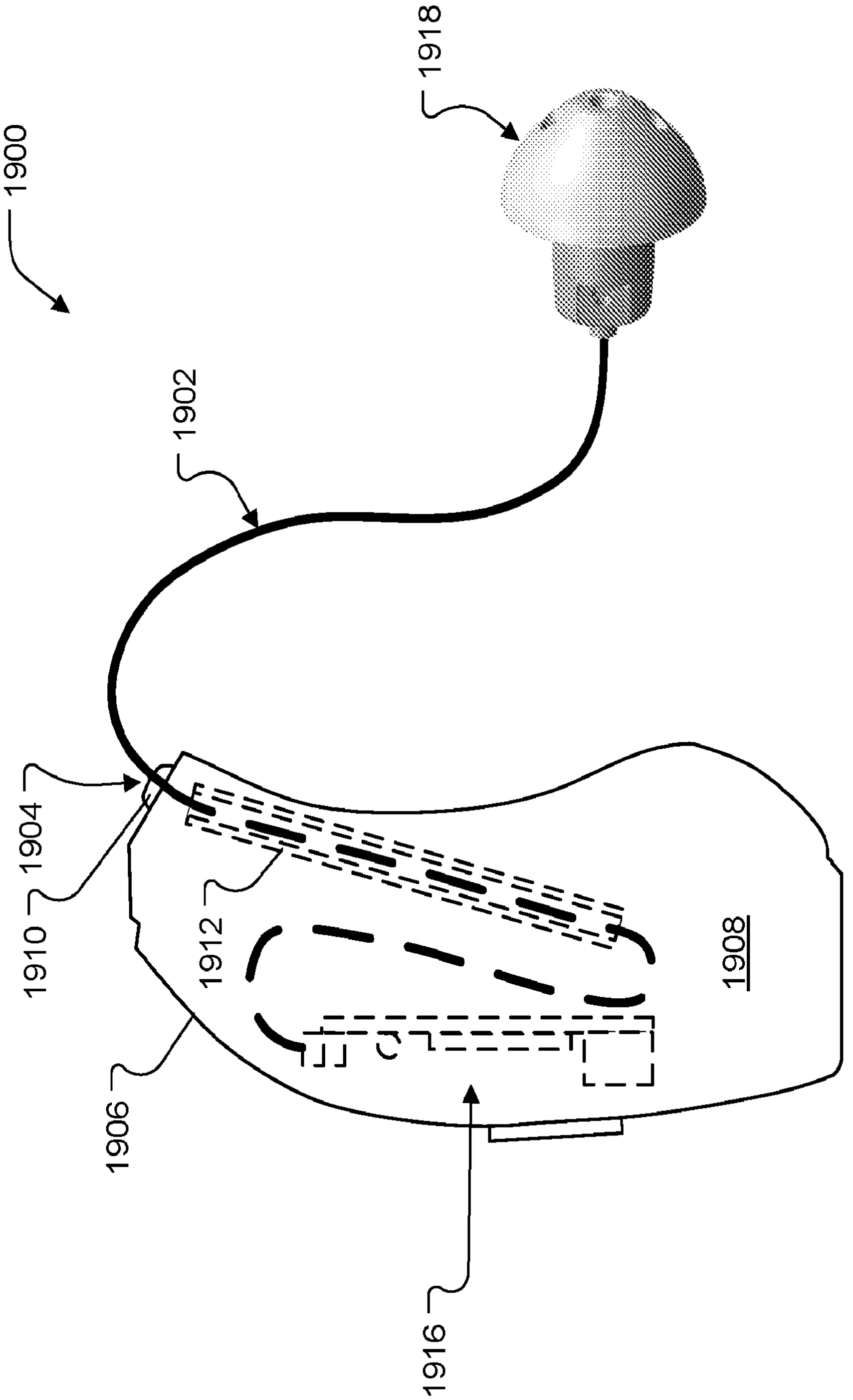
FIGS. 19A-22 are schematic side views of various implementations of a hearing aid in which an effective length of a coupling member can be adjusted by accommodating a section of the coupling member within a casing of a behind-the-ear portion of the hearing aid.

In some cases, the coupling member may be provided with an extended length and excess slack may be accommodated in the casing. For example, FIG. 19A illustrates an implementation of a hearing aid 1900 in which excess slack in the coupling member 1902 may be fed into an aperture 1904 in the casing 1906. The casing 1906 may define a cavity 1908 within which the excess slack is received and retained. An O-ring 1910 may be provided in the aperture 1904 to provide a seal between the coupling member 1902 and the casing 1906 and/or to provide a friction surface that inhibits movement of the coupling member 1902 once the length has been set. The user may feed the excess slack into the cavity 1908 by pinching the coupling member 1902 and pushing it into the aperture 1904 until the desired length is achieved.

Slide Inside-Guide Member

A section of rigid tube 1912 (FIG. 19A) or a guide rib 1914 (FIG. 19B), may be disposed within the cavity 1908 to help guide the portion of the coupling member 1902 that is received within the casing 1906. One end of the coupling member 1902 may be connected to the electronics 1916 in the casing 1906 with the opposite end being coupled to the earpiece 1918. The rigid tube 1912 and/or guide rib 1914 may be formed, e.g., molded, integrally with the casing 1906.

Figure 19B:
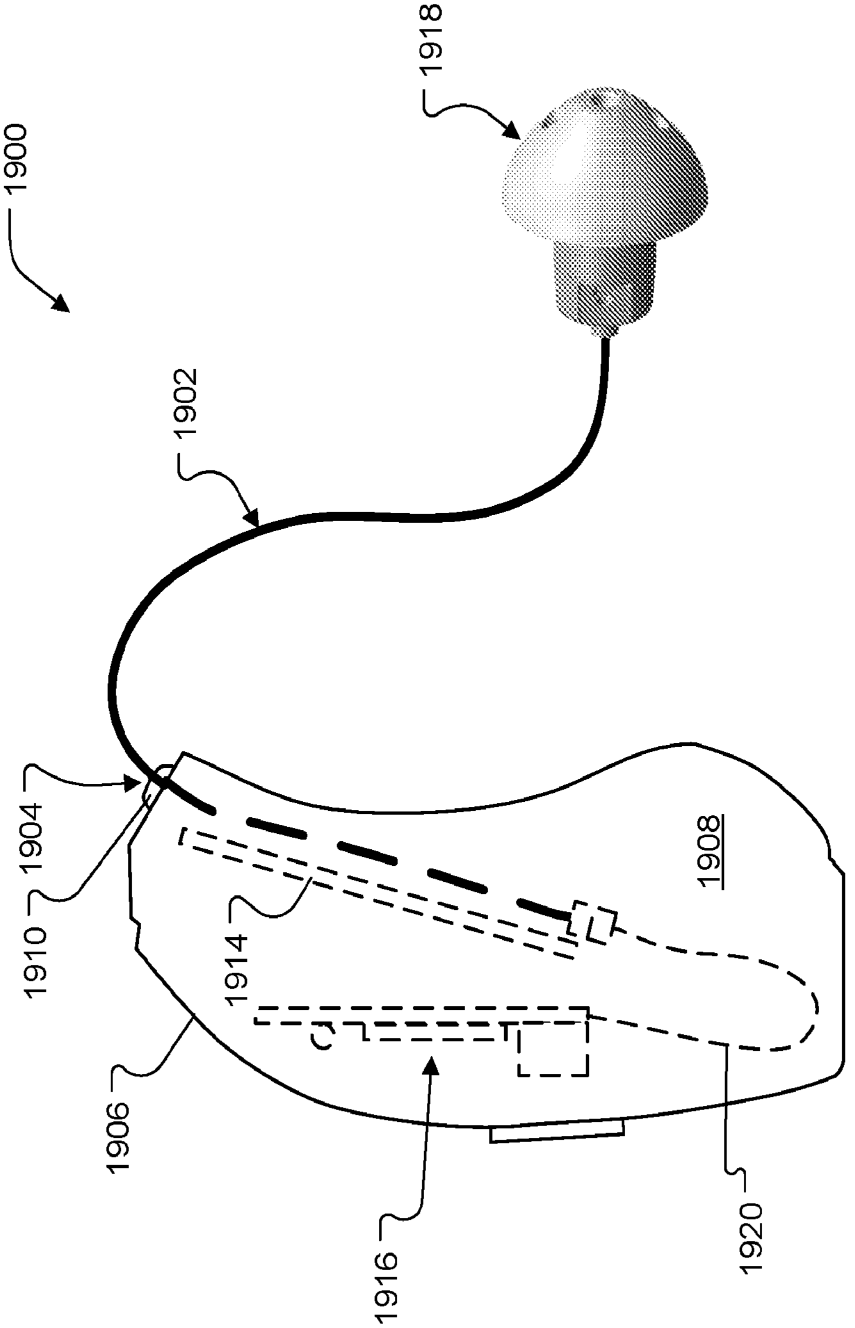

With reference to FIG. 19B, in some cases, the coupling member 1902 may be attached, e.g., soldered to or coupled via electrical connectors, at one end to a flexible printed circuit board 1920 that is disposed within the cavity 1908 defined by the casing 1906. The flexible printed circuit board 1920 may be coupled, e.g., soldered or connected via electrical connectors, at its opposite end, the electronics 1916. In some cases, the flexible printed circuit board 1920 may be integrated into a printed wiring board that supports the electronics 1916 in a flex-rigid construction. The flexible printed circuit board 1920 may provide additional flexibility within the cavity 1908; i.e., it may be more flexible than the coupling member 1902 itself.

Slide Inside-Thumb Adjust

Figure 20:
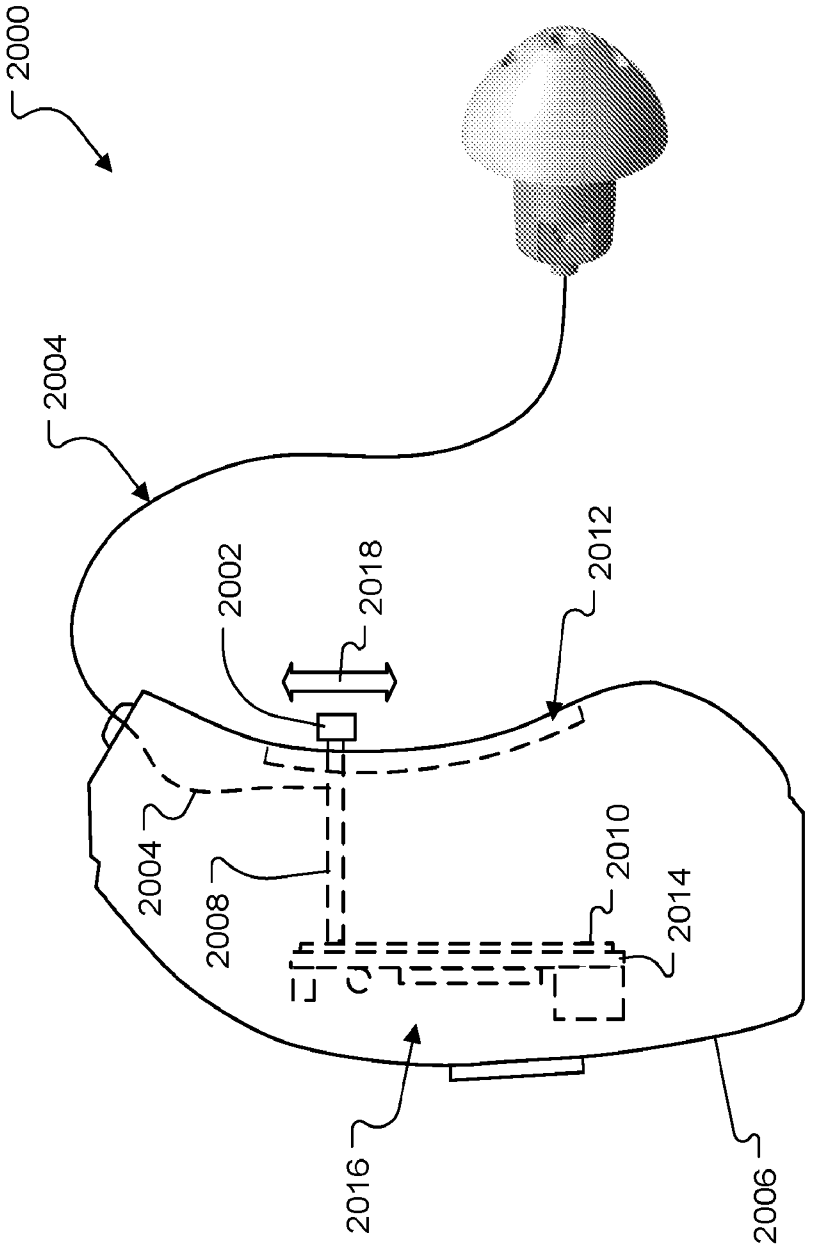

In some cases, an adjustment mechanism may be supported on the casing to help adjust the effective length of the coupling member. For example, FIG. 20 illustrates an implementation of a hearing aid 2000 in which an adjustment member 2002 is attached to the coupling member 2004 and is slidably supported on the casing 2006. The adjustment member 2002 may support one or more electrical contacts 2008 that are electrically coupled to the coupling member 2004 and are arranged to establish an electrical connection with an electrical contact 2010 within the casing 2006. The adjustment member 2002 may slide within a slot 2012 defined by the casing 2006 and the electrical contact 2008 supported on the adjustment member 2002 may slide along the electrical contact 2010 within the casing 2006. The electrical contact 2010 within the casing 2006 may be an exposed conductive surface on a printed wiring board 2014 which may also support other components of the electronics 2016. The user may adjust the effective length of the coupling member 2004 by sliding the adjustment member 2002, relative to the casing 2006, with his/her thumb, as indicated by arrow 2018.

Figure 21:
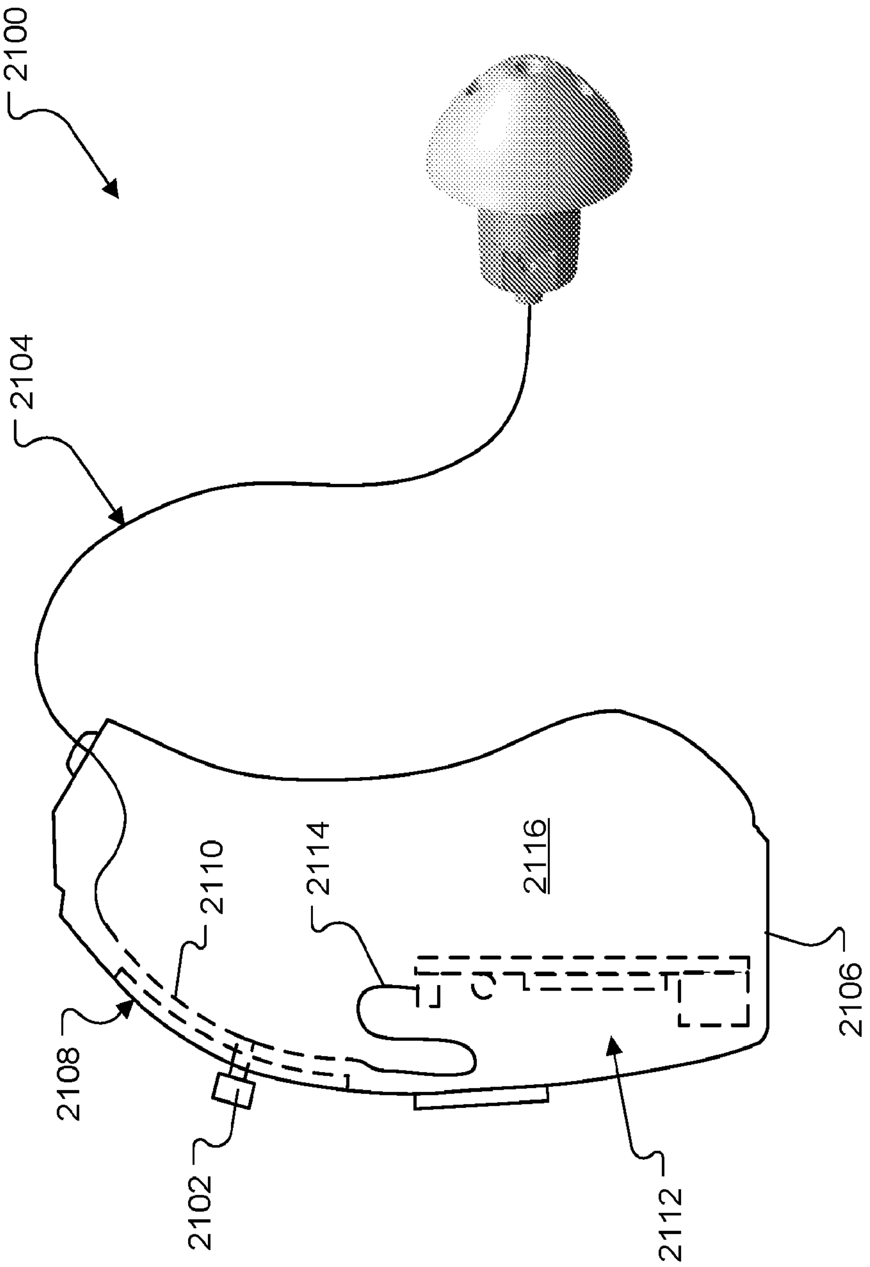

FIG. 21 illustrates another configuration of a hearing aid 2100 in which an adjustment member 2102 is coupled to a coupling member 2104 and is slidably supported on a casing 2106. The adjustment member 2102 may slide within a slot 2108 defined by the casing 2106. In the implementation illustrated in FIG. 21, an electrically conductive rigid member 2110 is affixed to, and moves with, the adjustment member 2102. The rigid member 2110 may be formed of a strip of metal, e.g., copper. One end of the coupling member 2104 is electrically and mechanically coupled to a first end of the electrically conductive rigid member 2110, e.g., via an electrical connector or solder joint, and a second end of the electrically conductive rigid member 2110 is coupled to the electronics 2112, e.g., via wiring 2114. The effective length of the coupling member 2104 is adjusted by displacing the adjustment member 2102 along the slot 2108. In other configurations, the coupling member 2104 may be directly coupled to the electronics 2112, mechanically and electrically, and the adjustment member 2102 may be mechanically coupled to the coupling member 2104 to adjust the length of the coupling member 2104. Excess slack in the coupling member 2104 is accommodated in a cavity 2116 defined by the casing 2106.

Figure 22:
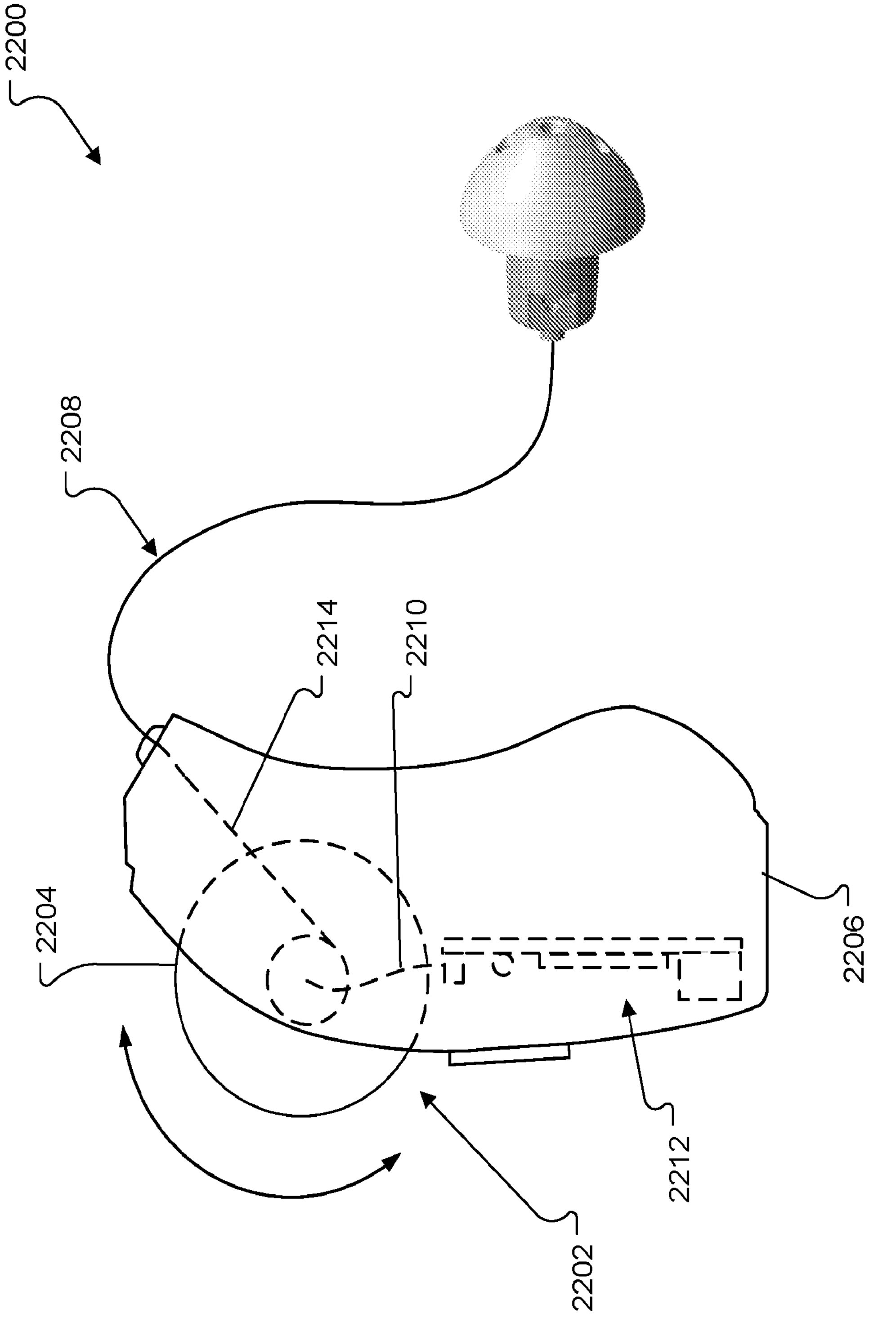

FIG. 22 illustrates another implementation of a hearing aid 2200 in which the adjustment member 2202 is configured in the form of a reel 2204 that is supported on the casing 2206 and can be rotated, e.g., via the user's thumb, to draw in/wind up excess slack in the coupling member 2208 to adjust the effective length of the coupling member 2208. A first end portion 2210 of the coupling member 2208 is coupled to the electronics 2212 and may be run through a center of the reel 2204. A second portion 2214 of the coupling member 2208 is at least partially wound around the reel 2204.

When feeding, e.g., pushing or drawing, the coupling member into the casing, such as described above with respect to FIGS. 19A-22, it may be desirable if the coupling member is relatively loose/flexible so that it better conforms to the interior of the casing. However, a stiffer coupling member can be beneficial for helping to keep the hearing aid stable when it worn.

In some implementations, to help balance these competing interests, the coupling member may be formed, at least partially, from a material that is stiffened when exposed to heat. In that regard, the coupling member may incorporate a shrink wrap material such as PVC, polyolefin, polyethylene, and polypropylene. In which case, the coupling member can be adjusted to length in a loose/flexible state, and, once the coupling member has been adjusted to the desired length, it can then be exposed to heat, e.g., via a heat gun, to stiffen the material. The stiffening of the coupling member can help to hold the coupling member at the selected length and it can also provide for stabilization of the earpiece in the user's ear when the hearing aid is worn.

Figure 23:
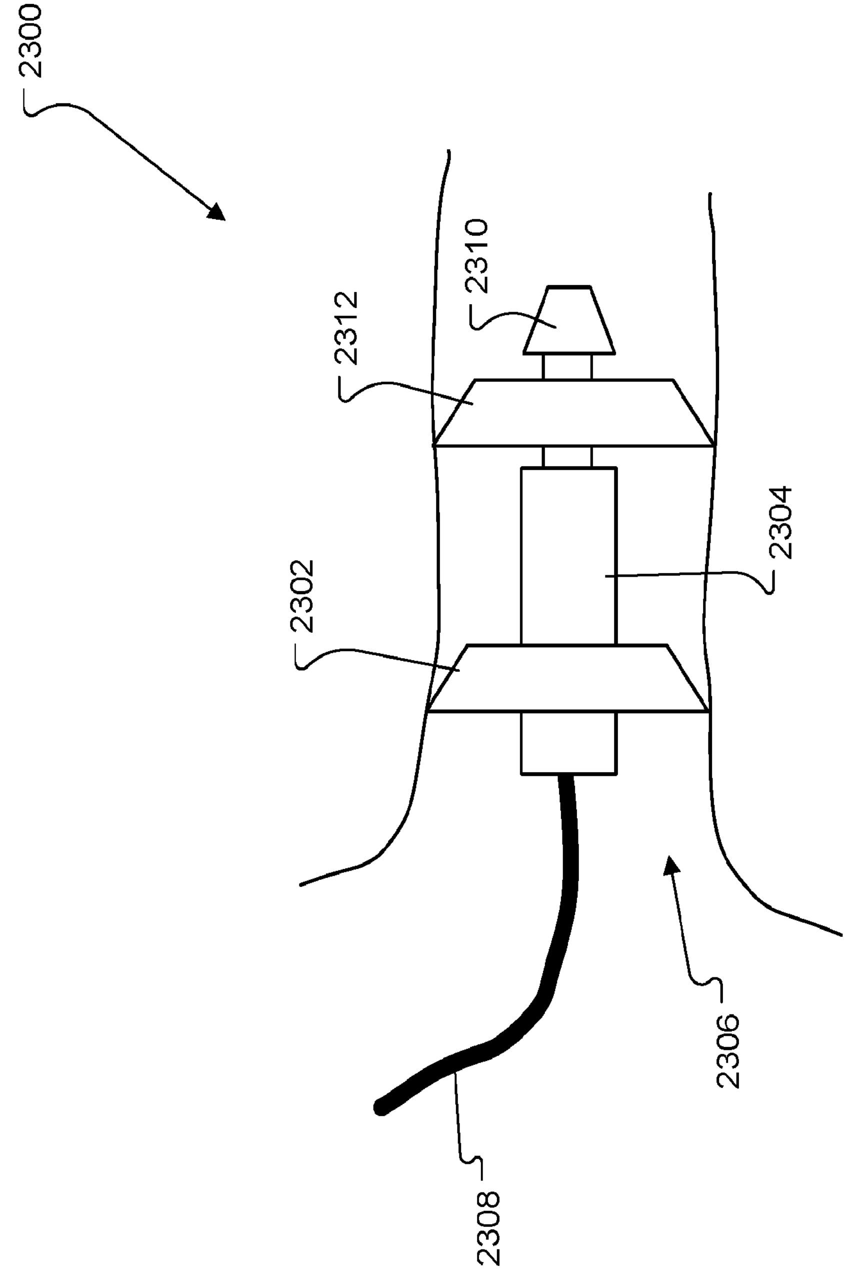
FIG. 23 is a schematic side view of an earpiece having a stabilizing feature disposed within an ear canal.

Alternatively, or additionally, the earpiece may be configured for added stability. For example, FIG. 23 illustrates an implementation of an earpiece 2300 that includes a second dome 2302 for additional stability. The earpiece 2300 includes a housing 2304 that is configured to sit at least partially within a user's ear canal 2306. The housing 2304 may be formed of a rigid material, e.g., a rigid plastic such as Acrylonitrile Butadiene Styrene (ABS), Polycarbonate/Acrylonitrile Butadiene Styrene (PCB/ABS), polyetherimide (PEI), or stereolithography (SLA) resin). At a first end, the housing 2304 is coupled to a coupling member 2308. At a second, opposite end, the housing 2304 defines a nozzle 2310 to deliver acoustic energy to the user's ear canal 2306. A first dome 2312 is supported on the nozzle 2310 for engaging with a user's ear canal. The first dome 2312 helps to retain the earpiece 2300 in the user's ear canal. The second dome 2302 is supported on the housing 2304 and is positioned between the first dome 2312 and the first end of the housing 2304. The second dome 2302 also engages the user's ear canal and provides for additional stability of the earpiece 2300 when worn. The first and second domes 2312, 2302 may be made of any suitable soft flexible materials including, for example, silicone, polyurethane, polynorbornene (e.g., Norsorex® material available from D-NOV GmbH of Vienna, Austria), thermoplastic elastomer (TPE), and/or fluoroelastomer.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

What is claimed is:

1. A hearing aid comprising:

an earpiece configured to sit at least partially within the user's ear canal when worn;

a casing supporting electronics including a sound processor and a microphone and configured to sit behind a user's ear and in contact with the user's pinna when worn; and a coupling member coupling the casing to the earpiece, wherein the coupling member has an effective length that is adjustable to accommodate users with different ear geometries, wherein the casing defines an aperture and a cavity within which the sound processor is disposed, wherein the effective length of the coupling member can be adjusted by pushing or drawing a portion of the coupling member into the cavity via the aperture, wherein slack in the portion of the coupling member that is pushed or drawn into the housing is retained within the cavity, wherein the coupling member is coupled to a first end of a flexible printed circuit board that is disposed within the cavity and a second, opposite end of the flexible printed circuit board is coupled to the electronics, and wherein the flexible printed circuit board is more flexible than the coupling member.

2. The hearing aid of claim 1, further comprising a guide member disposed within the cavity and arranged to help guide the portion of the coupling member that is received within the housing.

3. The hearing aid of claim 2, wherein the guide member comprises a rigid tube.

4. The hearing aid of claim 2, wherein the guide member is configured such that a loop is formed in the slack, wherein the loop is retained within the cavity.

5. The hearing aid of claim 4, wherein the guide member is formed integrally with the casing.

6. The hearing aid of claim 1, wherein the coupling member is at least partially formed of a material that stiffens when heat is applied to it, and wherein the effective length of the coupling member is configured to be adjusted by pushing or drawing a portion of the coupling member into the cavity via the aperture while the coupling member is in a loose flexible state, and the effective length is fixed in place by applying heat to stiffen the coupling member.

7. The hearing aid of claim 1, wherein the slack includes a loop that is retained within the cavity.

8. The hearing aid of claim 1, further comprising a gasket disposed in the aperture and providing a friction surface that inhibits movement of the coupling member.

9. The hearing aid of claim 8, wherein the gasket provides a seal between the coupling member and the casing.

10. The hearing aid of claim 8, wherein the gasket is an O-ring.

11. The hearing aid of claim 1, wherein flexible printed circuit board is integrated into a printed wiring board that supports the electronics in a flex-rigid construction.

* * * * *